(12) United States Patent
Takagi et al.

(10) Patent No.: US 12,498,553 B2
(45) Date of Patent: Dec. 16, 2025

(54) MICROSCOPE OBJECTIVE LENS, MICROSCOPE OPTICAL SYSTEM, AND MICROSCOPE DEVICE

(71) Applicant: NIKON CORPORATION, Tokyo (JP)

(72) Inventors: Hidetsugu Takagi, Yokohama (JP); Hitoshi Hatada, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 248 days.

(21) Appl. No.: 18/269,166

(22) PCT Filed: Dec. 15, 2021

(86) PCT No.: PCT/JP2021/046210
§ 371 (c)(1),
(2) Date: Jun. 22, 2023

(87) PCT Pub. No.: WO2022/138365
PCT Pub. Date: Jun. 30, 2022

(65) Prior Publication Data
US 2024/0045192 A1 Feb. 8, 2024

(30) Foreign Application Priority Data

Dec. 25, 2020 (JP) .................. 2020-216774
Mar. 8, 2021 (JP) .................. 2021-036167

(51) Int. Cl.
*G02B 9/34* (2006.01)
*G02B 21/02* (2006.01)
(52) U.S. Cl.
CPC .............. *G02B 21/02* (2013.01); *G02B 9/34* (2013.01)

(58) Field of Classification Search
CPC .......... G02B 21/02; G02B 9/34; G02B 21/00
See application file for complete search history.

(56) References Cited

U.S. PATENT DOCUMENTS

2016/0313661 A1  10/2016  Sekiguchi et al.

FOREIGN PATENT DOCUMENTS

| JP | 5-142477 | 6/1993 |
|---|---|---|
| JP | 2016-206387 A | 12/2016 |

OTHER PUBLICATIONS

Written Opinion of the International Searching Authority dated Jun. 13, 2023 for International Application No. PCT/JP2021/046210.
(Continued)

*Primary Examiner* — Towfiq Elahi
(74) *Attorney, Agent, or Firm* — STAAS & HALSEY LLP

(57) ABSTRACT

A microscope objective lens (OL) is constituted by a first lens group (G1), a second lens group (G2) having a positive refractive power, a third lens group (G3) having a concave surface facing the image side, and a fourth lens group (G4) having a concave surface facing the object side. The first lens group (G1) is constituted by a plano-convex positive lens (L101) having a flat surface facing the object side, and a negative lens (L102) and satisfies the following conditional: $1.8 < H1/H2 < 3.5$ and $1.3 < DLe/H2 < 3.5$, where: H1 is the distance between the optical axis and the light ray most separated from the optical axis in the second lens group (G2), from among light rays emitted from an object (OB) on the optical axis; H2 is the distance between the optical axis and the light ray most separated from the optical axis at a lens surface on the image side of a final lens (Le); and DLe is the length of the final lens (Le) on the optical axis.

15 Claims, 18 Drawing Sheets

(56) References Cited

OTHER PUBLICATIONS

Office Action issued by the Japanese Patent office on Oct. 29, 2024 for Japanese Patent Application No. 2023-213848.
International Search Report dated Mar. 1, 2022 for International Application No. PCT/JP2021/046210.

FIG.8
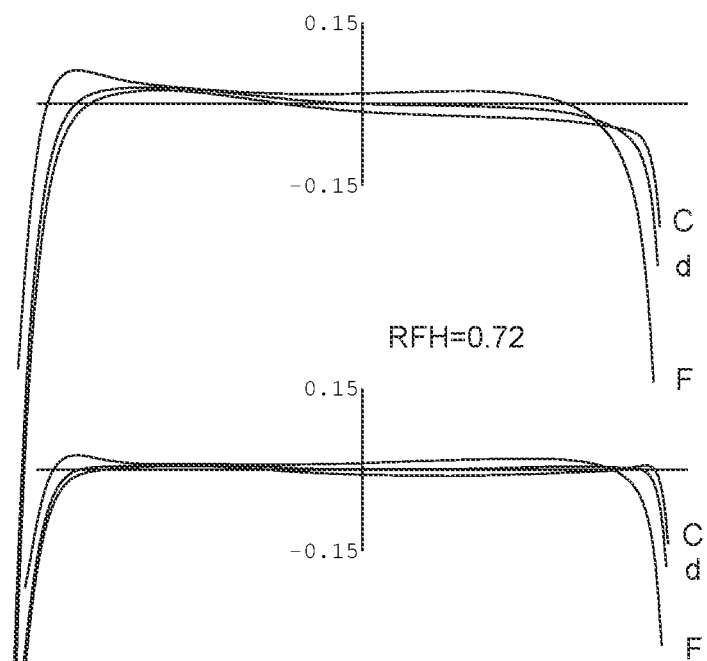
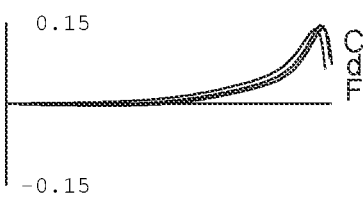
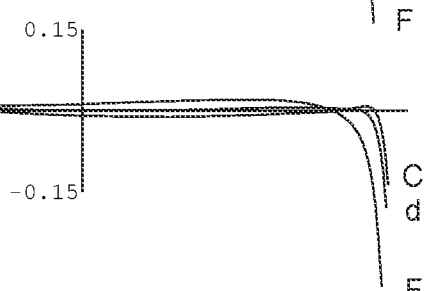
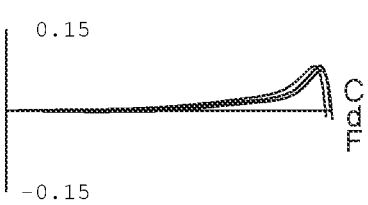
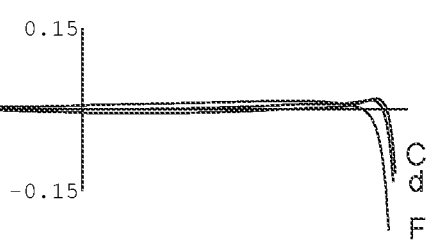
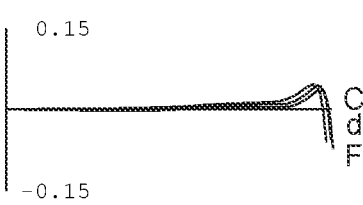
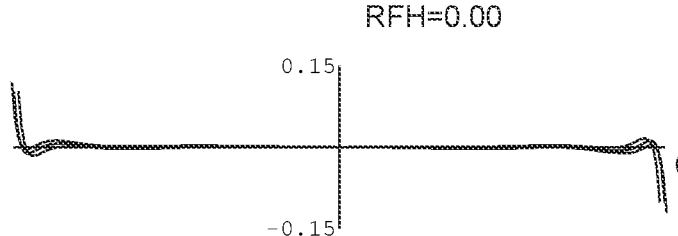
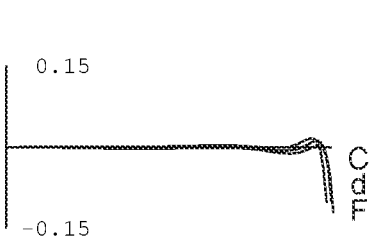

FIG.12
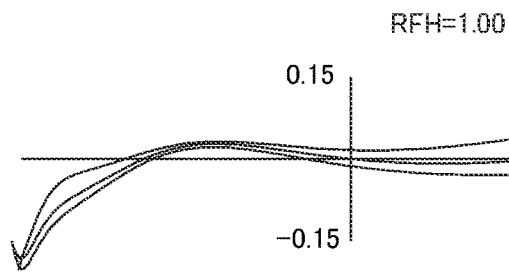
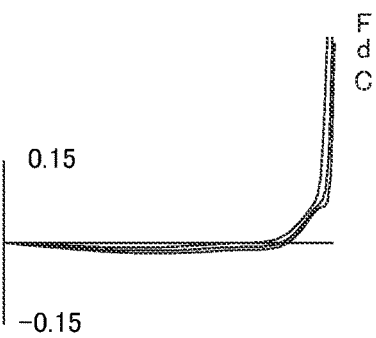
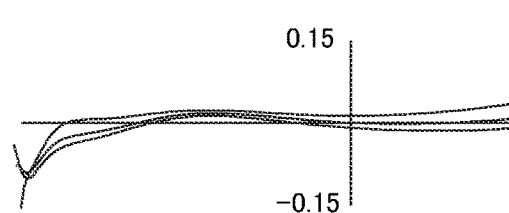
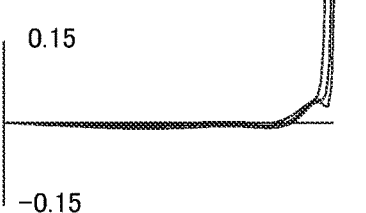
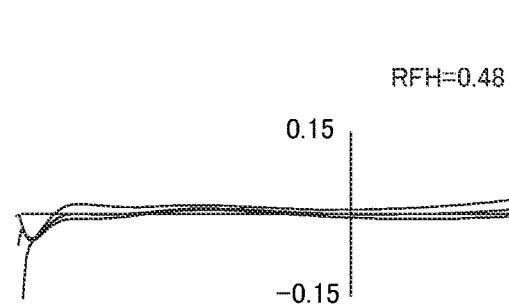
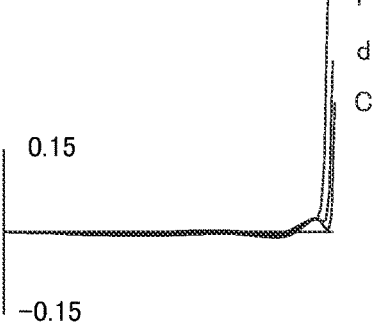
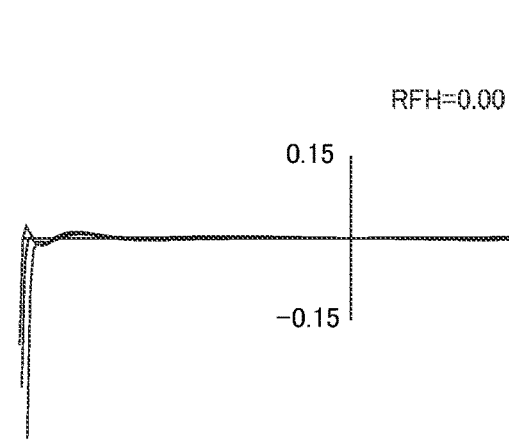
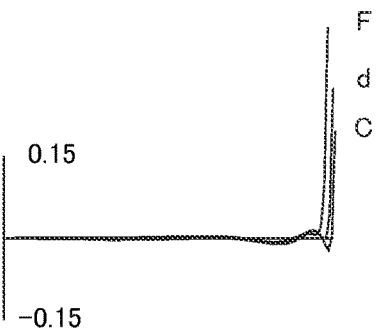

FIG.16
MERIDIONAL COMA ABERRATIONS    SAGITTAL COMA ABERRATIONS
RFH=1.00
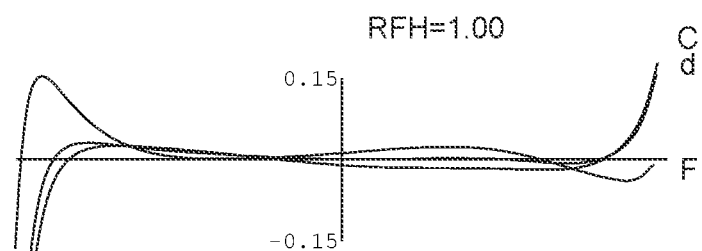 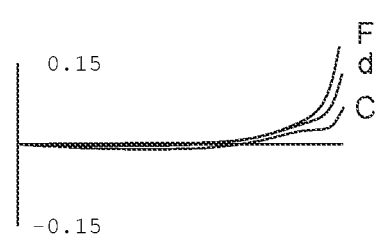
RFH=0.72
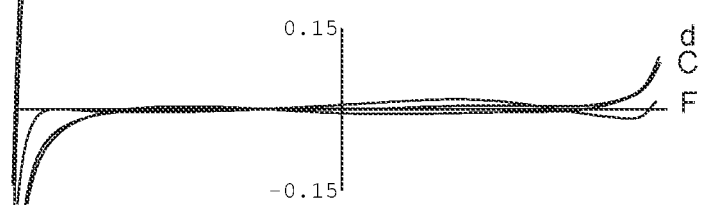 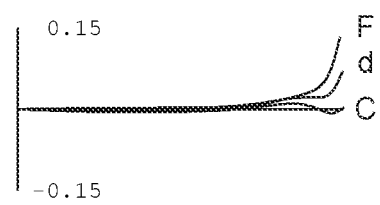
RFH=0.48
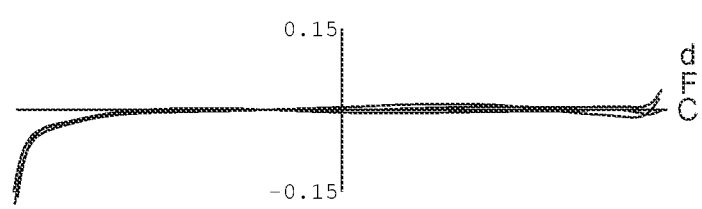 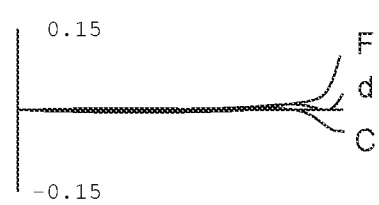
RFH=0.00
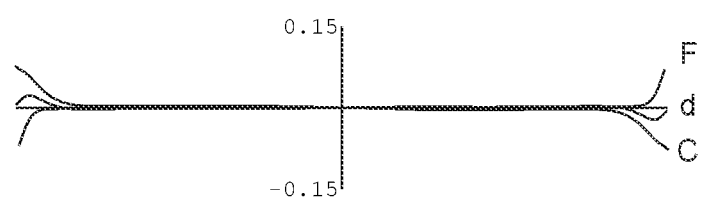 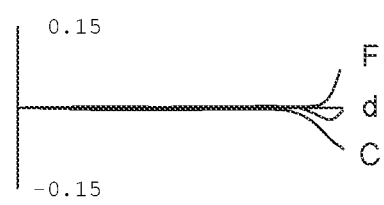

MICROSCOPE OBJECTIVE LENS, MICROSCOPE OPTICAL SYSTEM, AND MICROSCOPE DEVICE

CROSS REFERENCE TO RELATED APPLICATIONS

This application is a U.S. National Stage Application which claims the benefit under 35 U.S.C. § 371 of International Patent Application No. PCT/JP2021/046210 filed on Dec. 15, 2021, which claims priority benefit from Japanese Patent Application No. 2020-216774 filed on Dec. 25, 2020 and Japanese Patent Application No. 2021-036167 filed on Mar. 8, 2021, the contents of each of which are incorporated herein by reference.

TECHNICAL FIELD

The present invention relates to a microscope objective lens, a microscope optical system, and a microscope device.

TECHNICAL BACKGROUND

Recently, various kinds of microscope objective lenses having a high magnification and a large numerical aperture have been proposed (refer to Patent literature 1, for example). Such an objective lens is required to excellently correct a variety of aberrations such as chromatic aberration of magnification.

PRIOR ARTS LIST

Patent Document

Patent literature 1: Japanese Laid-Open Patent Publication No. 2016-206387 (A)

SUMMARY OF THE INVENTION

A microscope objective lens according to the present invention consists of a first lens group, a second lens group having positive refractive power, a third lens group having a concave surface facing an image side, and a fourth lens group having a concave surface facing an object side, the lens groups being arranged in order from the object side along an optical axis, the first lens group consists of a plano-convex positive lens having a flat surface facing the object side and a negative lens, the lenses being arranged in order from the object side along the optical axis, and the following conditional expressions are satisfied, $$1.8 < H1/H2 < 3.5$$

$$1.3 < DLe/H2 < 3.5$$

where, H1: distance from the optical axis to a light beam farthest from the optical axis in the second lens group among light beams emitted from an object on the optical axis, H2: distance from the optical axis to a light beam farthest from the optical axis at a lens surface of a final lens among light beams emitted from the object on the optical axis, the final lens being disposed closest to the image side in the microscope objective lens, the lens surface being positioned on the image side, and DLe: length of the final lens on the optical axis.

A microscope optical system according to the present invention comprises the above-described microscope objective lens and a second objective lens that collects light from the microscope objective lens.

A microscope device according to the present invention comprises the above-described microscope objective lens.

BRIEF DESCRIPTION OF THE DRAWINGS

FIG. 8 is a coma aberration diagram of the microscope objective lens according to the second example;

FIG. 12 is a coma aberration diagram of the microscope objective lens according to the third example;

FIG. 16 is a coma aberration diagram of the microscope objective lens according to the fourth example;

DESCRIPTION OF THE EMBODIMENT

Figure 18:
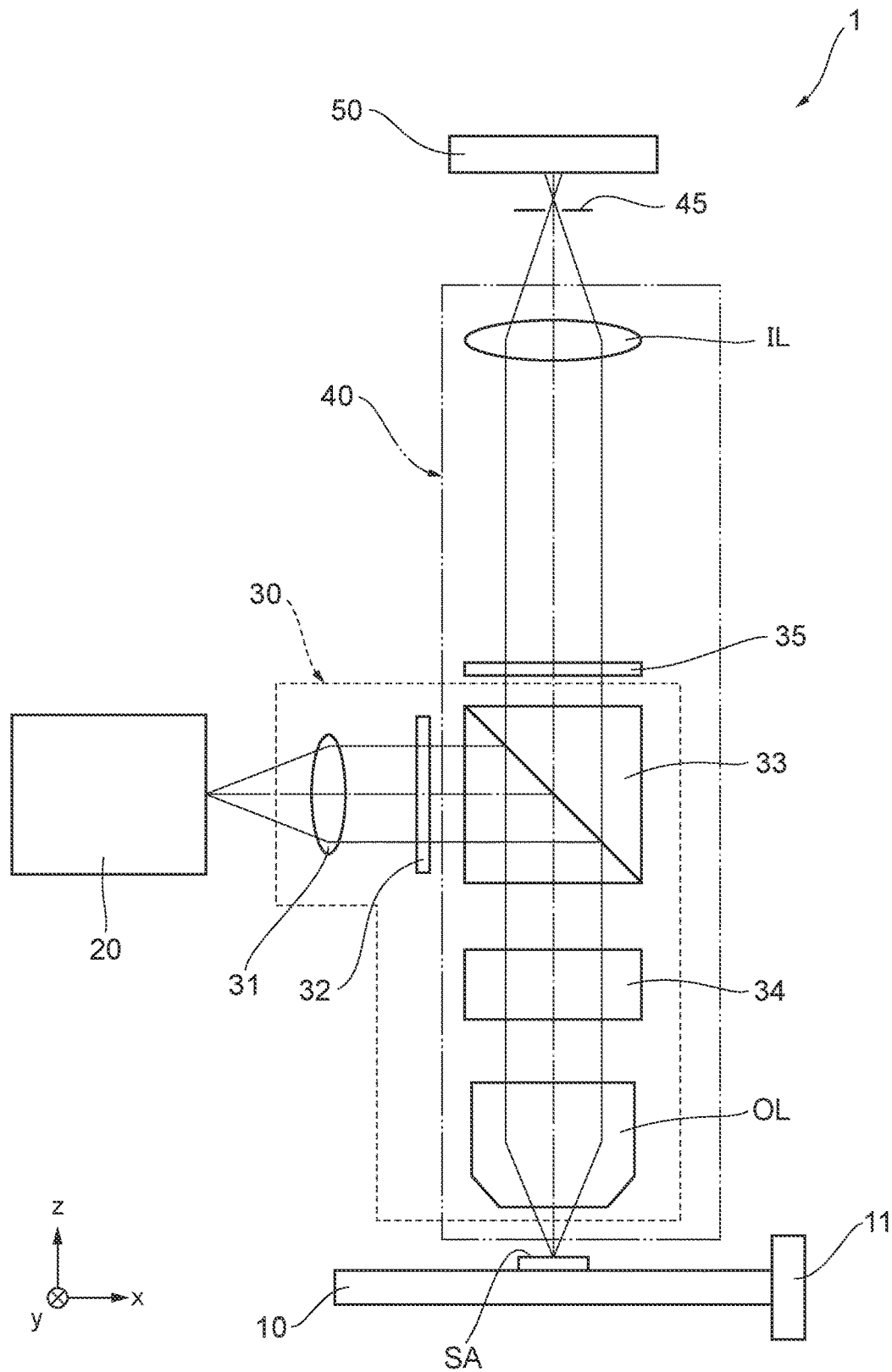
FIG. 18 is a schematic configuration diagram showing a confocal fluorescence microscope as an example of a microscope device.

A preferable embodiment according to the present invention will be described below. First, a microscope optical system and a confocal fluorescence microscope (microscope device) each comprising a microscope objective lens according to the present embodiment will be described with reference to FIG. 18. As shown in FIG. 18, a confocal fluorescence microscope 1 comprises a stage 10, a light source 20, an illumination optical system 30, a microscope optical system 40, and a detection part 50. Hereinafter, a coordinate axis extending in the direction of the optical axis of the microscope objective lens in the confocal fluorescence microscope 1 is referred to as a z axis. In addition, coordinate axes extending in directions orthogonal to each other in a plane orthogonal to the z axis are referred to as an x axis and a y axis, respectively.

For example, a specimen SA held between a slide glass (not shown) and a cover glass (not shown) is placed on the stage 10. Alternatively, the specimen SA housed together with immersion liquid in a specimen container (not shown) may be placed on the stage 10. The specimen SA contains fluorescence material such as fluorescence pigment. The specimen SA is, for example, a cell that is fluorescently dyed in advance. A stage drive part 11 is provided near the stage 10. The stage drive part 11 moves the stage 10 along the z axis.

The light source 20 generates excitation light in a predetermined wavelength band. The light source 20 is, for example, a laser source capable of emitting a laser beam (excitation light) in the predetermined wavelength band. The predetermined wavelength band is set to a wavelength band with which the specimen SA containing the fluorescence material can be excited. The excitation light emitted from the light source 20 is incident on the illumination optical system 30.

The illumination optical system 30 illuminates the specimen SA on the stage 10 with the excitation light emitted from the light source 20. The illumination optical system 30 comprises a collimator lens 31, a beam splitter 33, and a scanner 34 in order from the light source 20 side to the specimen SA side. The illumination optical system 30 also comprises a microscope objective lens OL of the microscope optical system 40. The excitation light emitted from the light source 20 becomes parallel light through the collimator lens 31.

The beam splitter 33 has a characteristic that the beam splitter 33 reflects the excitation light from the light source 20 and transmits fluorescence from the specimen SA. The beam splitter 33 reflects the excitation light from the light source 20 toward the specimen SA on the stage 10. The beam splitter 33 transmits fluorescence generated at the specimen SA toward the detection part 50. An excitation filter 32 that transmits the excitation light from the light source 20 is disposed between the beam splitter 33 and the collimator lens 31. A fluorescence filter 35 that transmits the fluorescence from the specimen SA is disposed between the beam splitter 33 and a second objective lens IL of the microscope optical system 40.

The scanner 34 scans the specimen SA with the excitation light from the light source 20 in two directions of the x and y directions. The scanner 34 is, for example, a Galvano scanner or a resonant scanner.

The microscope optical system 40 collects the fluorescence generated at the specimen SA. The microscope optical system 40 comprises the microscope objective lens OL and the second objective lens IL in order from the specimen SA side to the detection part 50 side. The microscope optical system 40 also comprises the scanner 34 and the beam splitter 33 that are disposed between the microscope objective lens OL and the second objective lens IL. The microscope objective lens OL is oppositely disposed above the stage 10 on which the specimen SA is placed. The microscope objective lens OL collects the excitation light from the light source 20 onto the specimen SA on the stage 10. The microscope objective lens OL receives the fluorescence generated at the specimen SA and converts the fluorescence into parallel light. The second objective lens IL collects the fluorescence (parallel light) from the microscope objective lens OL.

The detection part 50 detects the fluorescence generated at the specimen SA through the microscope optical system 40. The detection part 50 is, for example, a photomultiplier. A pinhole 45 is provided between the microscope optical system 40 and the detection part 50. The pinhole 45 is disposed at a position conjugate to a focal position of the microscope objective lens OL on the specimen SA side. The pinhole 45 allows passing of only light from the focal plane of the microscope objective lens OL (plane orthogonal to the optical axis of the microscope objective lens OL and passing through the focal position of the microscope objective lens OL) or a plane shifted within a predetermined allowable shift range from the focal plane in the optical axis direction, and blocks the other light.

In the confocal fluorescence microscope 1 configured as described above, the excitation light emitted from the light source 20 transmits through the collimator lens 31 and becomes the parallel light. The excitation light having transmitted through the collimator lens 31 is incident on the beam splitter 33 through the excitation filter 32. The excitation light incident on the beam splitter 33 is reflected by the beam splitter 33 and incident on the scanner 34. The scanner 34 scans the specimen SA with the excitation light incident on the scanner 34 in the two directions of the x and y directions. After passing through the scanner 34, the excitation light incident on the scanner 34 transmits through the microscope objective lens OL and is collected to the focal plane of the microscope objective lens OL. A part of the specimen SA to which the excitation light is collected (in other words, a part overlapping the focal plane of the microscope objective lens OL) is two-dimensionally scanned in the two directions of the x and y directions by the scanner 34. In this manner, the illumination optical system 30 illuminates the specimen SA on the stage 10 with the excitation light emitted from the light source 20.

The fluorescence material contained in the specimen SA is excited through irradiation with the excitation light and emits the fluorescence. The fluorescence from the specimen SA transmits through the microscope objective lens OL and becomes the parallel light. The fluorescence having transmitted through the microscope objective lens OL is incident on the beam splitter 33 through the scanner 34. The fluorescence incident on the beam splitter 33 transmits through the beam splitter 33 and arrives at the fluorescence filter 35. After passing through the fluorescence filter 35, the fluorescence having arrived at the fluorescence filter 35 transmits through the second objective lens IL and is collected to the position conjugate to the focal position of the microscope objective lens OL. The fluorescence collected to the position conjugate to the focal position of the microscope objective lens OL passes through the pinhole 45 and is incident on the detection part 50.

The detection part 50 photoelectrically converts light (fluorescence) incident on the detection part 50 and generates, as a detection signal of the light, data corresponding to the light quantity (brightness) of the light. The detection part 50 outputs the generated data to a non-shown control part. Note that the control part performs processing of arranging the data input from the detection part 50 as data of one pixel in synchronization with two-dimensional scanning by the scanner 34 and generates one image data in which data of a plurality of pixels is two-dimensionally (in two directions) arranged. In this manner, the control part can acquire an image of the specimen SA.

The microscope device according to the present embodiment in the above description is the confocal fluorescence microscope 1 as an example but not limited thereto. The microscope device according to the present embodiment may be, for example, a confocal microscope or a multiphoton microscope. The confocal fluorescence microscope 1 may be an upright microscope or an invert microscope.

Figure 1:
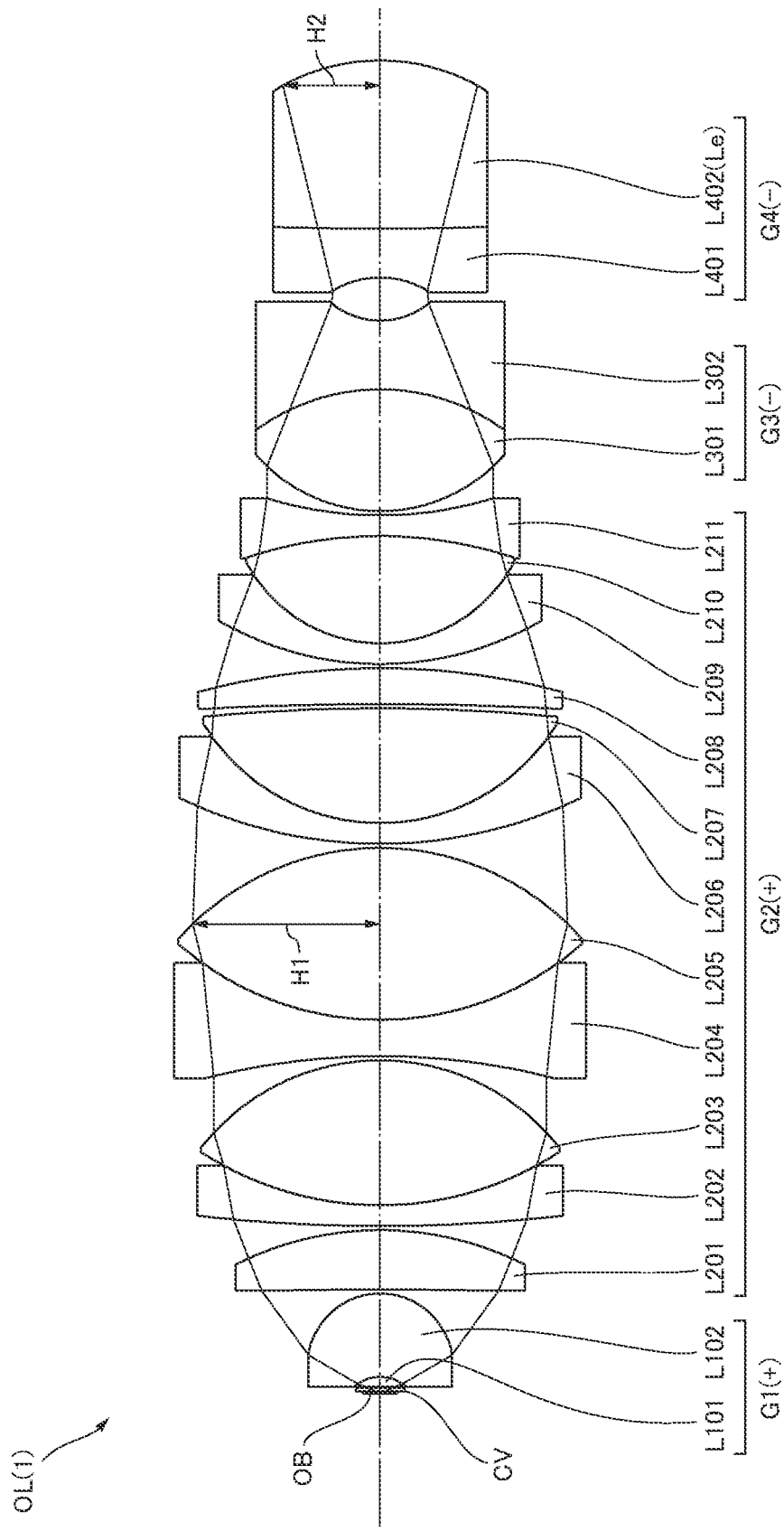
FIG. 1 is a cross-sectional view showing the configuration of a microscope objective lens according to a first example.

The microscope objective lens according to the present embodiment will be described below. A microscope objective lens OL(1) shown in FIG. 1 as an example of the microscope objective lens OL according to the present embodiment consists of a first lens group G1, a second lens group G2 having positive refractive power, a third lens group G3 having a concave surface facing an image side, a fourth lens group G4 having a concave surface facing an object side, the lens groups being arranged in order from the object side along an optical axis. The first lens group G1 consists of a plano-convex positive lens (L101) having a flat surface facing the object side and a negative lens (L102), the lenses being arranged in order from the object side along the optical axis. Note that the positive lens (L101) and the negative lens (L102) in the first lens group G1 are preferably cemented together. In FIG. 1, for example, an object OB represents an object surface.

With the above-described configuration, the microscope objective lens OL according to the present embodiment satisfies the following conditional expressions (1) and (2).

$$1.8 < H1/H2 < 3.5 \quad (1)$$

$$1.3 < DLe/H2 < 3.5 \quad (2)$$

Where, H1: distance from the optical axis to a light beam farthest from the optical axis in the second lens group G2 among light beams emitted from the object OB on the optical axis, H2: distance from the optical axis to a light beam farthest from the optical axis at a lens surface of a final lens Le among light beams emitted from the object OB on the optical axis, the final lens Le being disposed closest to the image side in the microscope objective lens OL, the lens surface being positioned on the image side, and DLe: length of the final lens Le on the optical axis.

According to the present embodiment, it is possible to obtain a microscope objective lens with a variety of aberrations such as chromatic aberration of magnification excellently corrected, and a microscope optical system and a microscope device each comprising the microscope objective lens. The microscope objective lens OL according to the present embodiment may be an optical system OL(2) shown in FIG. 5, an optical system OL(3) shown in FIG. 9, or an optical system OL(4) shown in FIG. 13.

Conditional Expression (1) defines an appropriate relation between the distance from the optical axis to a light beam farthest from the optical axis in the second lens group G2 among light beams emitted from the object OB on the optical axis and the distance from the optical axis to a light beam farthest from the optical axis at the lens surface of the final lens Le on the image side among light beams emitted from the object OB on the optical axis. When Conditional Expression (1) is satisfied, spherical aberration of a microscope objective lens having a high magnification and a large numerical aperture can be excellently corrected.

When the corresponding value of Conditional Expression (1) exceeds its upper limit value, it is difficult to correct spherical aberration while keeping a high magnification and a large numerical aperture. It is possible to secure the advantageous effect of the present embodiment by setting the upper limit value of Conditional Expression (1) to 3.45, 3.4, 3.25, 3.0, 2.75, 2.5, and further to 2.3.

When the corresponding value of Conditional Expression (1) exceeds its lower limit value, as well, it is difficult to correct spherical aberration while keeping a high magnification and a large numerical aperture. It is possible to secure the advantageous effect of the present embodiment by setting the lower limit value of Conditional Expression (1) to 1.85, and further to 1.9.

Conditional Expression (2) defines an appropriate relation between the length of the final lens Le on the optical axis and the distance from the optical axis to a light beam farthest from the optical axis at the lens surface of the final lens Le on the image side among light beams emitted from the object OB on the optical axis. When Conditional Expression (2) is satisfied, chromatic aberration of magnification can be excellently corrected.

When the corresponding value of Conditional Expression (2) exceeds its upper limit value, the length of the final lens Le on the optical axis is too large and thus it is difficult to correct coma aberration. It is possible to secure the advantageous effect of the present embodiment by setting the upper limit value of Conditional Expression (2) to 3.4, 3.2 and further to 3.17.

When the corresponding value of Conditional Expression (2) exceeds its lower limit value, the length of the final lens Le on the optical axis is small and thus it is difficult to correct chromatic aberration of magnification. It is possible to secure the advantageous effect of the present embodiment by setting the lower limit value of Conditional Expression (2) to 1.33, 1.35 and further to 1.37.

In the microscope objective lens OL according to the present embodiment, the fourth lens group G4 preferably consists of a negative lens L401 having a concave surface facing the object side and a positive lens L402, the lenses being arranged in order from the object side along the optical axis, and the final lens Le is preferably the positive lens L402 in the fourth lens group G4. Note that the negative lens L401 and the positive lens L402 in the fourth lens group G4 are preferably cemented together. The third lens group G3 preferably comprises a positive lens L301 and a negative lens L302 having a concave surface facing the image side, the lenses being arranged in order from the object side along the optical axis. The positive lens L301 and the negative lens L302 in the third lens group G3 are preferably cemented together.

The microscope objective lens OL according to the present embodiment preferably satisfies the following conditional expressions (3) and (4).

$$20 < vdLe < 30 \quad (3)$$

$$0 < -0.0035 \times (vdLe - 20) + 0.63 - \theta gFLe \quad (4)$$

Where, vdLe: Abbe number of the final lens Le, and
θgFLe: partial dispersion ratio of the final lens Le, which is defined by the following expression, $$\theta gFLe = (ngLe - nFLe)/(nFLe - nCLe)$$

where ngLe represents the refractive index of the final lens Le at the g-line, nFLe represents the refractive index of the final lens Le at the F-line, and nCLe represents the refractive index of the final lens Le at the C-line.

Conditional Expression (3) defines an appropriate range of the Abbe number of the final lens Le. When Conditional Expression (3) is satisfied, chromatic aberration of magnification can be excellently corrected.

When the corresponding value of Conditional Expression (3) exceeds its upper limit value, it is difficult to correct chromatic aberration of magnification. It is possible to secure the advantageous effect of the present embodiment by setting the upper limit value of Conditional Expression (3) to 28.5, 26.5 and further to 25.5.

When the corresponding value of Conditional Expression (3) exceeds its lower limit value, as well, it is difficult to correct chromatic aberration of magnification. It is possible to secure the advantageous effect of the present embodiment by setting the lower limit value of Conditional Expression (3) to 21.5, 23 and further to 24.

Conditional Expression (4) defines an appropriate relation between the Abbe number of the final lens Le and the partial dispersion ratio of the final lens Le. When Conditional Expression (4) is satisfied, chromatic aberration of magnification can be excellently corrected. When the corresponding value of Conditional Expression (4) exceeds its lower limit value, it is difficult to correct chromatic aberration of magnification.

The microscope objective lens OL according to the present embodiment may satisfy the following conditional expression (3-1).

$$20 < vdLe < 26 \quad (3\text{-}1)$$

Conditional Expression (3-1) is the same as Conditional Expression (3) and can provide the same effects as Conditional Expression (3). It is possible to secure the advantageous effect of the present embodiment by setting the upper limit value of Conditional Expression (3-1) to 25.75, and further to 25.5. It is possible to secure the advantageous effect of the present embodiment by setting the lower limit value of Conditional Expression (3-1) to 21.5, 23 and further to 24.

In the microscope objective lens OL according to the present embodiment, the second lens group G2 preferably comprises a plurality of positive lenses, and at least one of the plurality of positive lenses in the second lens group G2 preferably satisfies the following conditional expressions (5) and (6).

$$20 < vdLp < 40 \quad (5)$$

$$0.55 < \theta gFLp \quad (6)$$

Where, vdLp: Abbe number of the positive lens, and
θgFLp: partial dispersion ratio of the positive lens, which is defined by the following expression, $$\theta gFLp = (ngLp - nFLp)/(nFLp - nCLp)$$

where ngLp represents the refractive index of the positive lens at the g-line, nFLp represents the refractive index of the positive lens at the F-line, and nCLp represents the refractive index of the positive lens at the C-line.

Conditional Expression (5) defines an appropriate range of the Abbe number of the positive lens in the second lens group G2. When Conditional Expression (5) is satisfied, the secondary spectrum of longitudinal chromatic aberration can be excellently corrected.

When the corresponding value of Conditional Expression (5) exceeds its upper limit value, it is difficult to correct the secondary spectrum of longitudinal chromatic aberration. It is possible to secure the advantageous effect of the present embodiment by setting the upper limit value of Conditional Expression (5) to 38.5, 37.5, 35, 32, and further to 30.

When the corresponding value of Conditional Expression (5) exceeds its lower limit value, as well, it is difficult to correct the secondary spectrum of longitudinal chromatic aberration. It is possible to secure the advantageous effect of the present embodiment by setting the lower limit value of Conditional Expression (5) to 20.5, and further to 21.0.

Conditional Expression (6) defines an appropriate range of the partial dispersion ratio of the positive lens in the second lens group G2. When Conditional Expression (6) is satisfied, the secondary spectrum of longitudinal chromatic aberration can be excellently corrected.

When the corresponding value of Conditional Expression (6) exceeds its lower limit value, it is difficult to correct the secondary spectrum of longitudinal chromatic aberration. It is possible to secure the advantageous effect of the present embodiment by setting the lower limit value of Conditional Expression (6) to 0.57, and further to 0.60.

In the microscope objective lens OL according to the present embodiment, at least one of the plurality of positive lenses in the second lens group G2 preferably satisfies the following conditional expression (7).

$$0 < fLp/f < 45 \quad (7)$$

Where,
fLp: focal length of the positive lens, and
f: focal length of the microscope objective lens OL.

Conditional Expression (7) defines an appropriate relation between the focal length of the positive lens in the second lens group G2 and the focal length of the microscope objective lens OL. When Conditional Expression (7) is satisfied, the secondary spectrum of longitudinal chromatic aberration can be excellently corrected.

When the corresponding value of Conditional Expression (7) exceeds its upper limit value, it is difficult to correct the secondary spectrum of longitudinal chromatic aberration. It is possible to secure the advantageous effect of the present embodiment by setting the upper limit value of Conditional Expression (7) to 42.5, 40, 35, 30, and further to 25.

When the corresponding value of Conditional Expression (7) exceeds its lower limit value, as well, it is difficult to correct the secondary spectrum of longitudinal chromatic aberration. It is possible to secure the advantageous effect of the present embodiment by setting the lower limit value of Conditional Expression (7) to 5, 7.5, 10, and further to 12.

In the microscope objective lens OL according to the present embodiment, at least one of the plurality of positive lenses in the second lens group G2 may satisfy the following conditional expression (7-1).

$$12.5 < fLp/f < 45 \quad (7\text{-}1)$$

Conditional Expression (7-1) is the same as Conditional Expression (7) and can provide the same effects as Conditional Expression (7). It is possible to secure the advantageous effect of the present embodiment by setting the upper limit value of Conditional Expression (7-1) to 42.5, 40, 35, 30, and further to 25. It is possible to secure the advantageous effect of the present embodiment by setting the lower limit value of Conditional Expression (7-1) to 13, 13.5, 14, 14.5, and further to 15.

In the microscope objective lens OL according to the present embodiment, the positive lens in the second lens group G2 is preferably disposed on the image side of a lens surface through which a light beam farthest from the optical axis passes in the second lens group G2. In the microscope objective lens OL according to the present embodiment, the positive lens in the second lens group G2 may be disposed closest to the object side in the second lens group G2.

The microscope objective lens OL according to the present embodiment preferably satisfies the following conditional expression (8).

$$1.75 < f1/f < 2.5 \quad (8)$$

Where,
f1: focal length of the first lens group G1, and
f: focal length of the microscope objective lens OL.

Conditional Expression (8) defines an appropriate relation between the focal length of the first lens group G1 and the focal length of the microscope objective lens OL. When Conditional Expression (8) is satisfied, curvature of field can be excellently corrected.

When the corresponding value of Conditional Expression (8) exceeds its upper limit value, it is difficult to correct curvature of field. It is possible to secure the advantageous effect of the present embodiment by setting the upper limit value of Conditional Expression (8) to 2.45, 2.35, 2.25, and further to 2.2.

When the corresponding value of Conditional Expression (8) exceeds its lower limit value, as well, it is difficult to correct curvature of field. It is possible to secure the advantageous effect of the present embodiment by setting the lower limit value of Conditional Expression (8) to 1.76, and further to 1.78.

The microscope objective lens OL according to the present embodiment preferably satisfies the following conditional expression (9).

$$3 < f2/f < 7 \qquad (9)$$

Where,
f2: focal length of the second lens group G2, and
f: focal length of the microscope objective lens OL.

Conditional Expression (9) defines an appropriate relation between the focal length of the second lens group G2 and the focal length of the microscope objective lens OL. When Conditional Expression (9) is satisfied, spherical aberration, coma aberration, and longitudinal chromatic aberration of a microscope objective lens having a large numerical aperture can be excellently corrected.

When the corresponding value of Conditional Expression (9) exceeds its upper limit value, it is difficult to correct spherical aberration, coma aberration, and longitudinal chromatic aberration while keeping a large numerical aperture. It is possible to secure the advantageous effect of the present embodiment by setting the upper limit value of Conditional Expression (9) to 6.8, 6.5, 6.3, 6, and further to 5.85.

When the corresponding value of Conditional Expression (9) exceeds its lower limit value, as well, it is difficult to correct spherical aberration, coma aberration, and longitudinal chromatic aberration while keeping a large numerical aperture. It is possible to secure the advantageous effect of the present embodiment by setting the lower limit value of Conditional Expression (9) to 3.15, 3.3, 3.4, and further to 3.5.

The microscope objective lens OL according to the present embodiment preferably satisfies the following conditional expression (10).

$$f3/f < 0 \qquad (10)$$

Where,
f3: focal length of the third lens group G3, and
f: focal length of the microscope objective lens OL.

Conditional Expression (10) defines an appropriate relation between the focal length of the third lens group G3 and the focal length of the microscope objective lens OL. When Conditional Expression (10) is satisfied, curvature of field, coma aberration, and astigmatism of a microscope objective lens having a large numerical aperture can be excellently corrected.

When the corresponding value of Conditional Expression (10) exceeds its upper limit value, it is difficult to correct curvature of field, coma aberration, and astigmatism while keeping a large numerical aperture. It is possible to secure the advantageous effect of the present embodiment by setting the upper limit value of Conditional Expression (10) to −1, −5, −7.5, and further to −10.

The microscope objective lens OL according to the present embodiment preferably satisfies the following conditional expression (11).

$$f4/f < 0 \qquad (11)$$

Where,
f4: focal length of the fourth lens group G4, and
f: focal length of the microscope objective lens OL.

Conditional Expression (11) defines an appropriate relation between the focal length of the fourth lens group G4 and the focal length of the microscope objective lens OL. When Conditional Expression (11) is satisfied, curvature of field, coma aberration, and astigmatism of a microscope objective lens having a large numerical aperture can be excellently corrected.

When the corresponding value of Conditional Expression (11) exceeds its upper limit value, it is difficult to correct curvature of field, coma aberration, and astigmatism while keeping a large numerical aperture. It is possible to secure the advantageous effect of the present embodiment by setting the upper limit value of Conditional Expression (11) to −1, −2.5, −5, −7.5, and further to −10.

In the microscope objective lens OL according to the present embodiment, the space between the second lens group G2 and the third lens group G3 is preferably changeable. It is possible to correct aberration that changes in accordance with the thickness of a cover glass CV by changing the space between the second lens group G2 and the third lens group G3 in accordance with the thickness of the cover glass CV.

EXAMPLES

Examples of the microscope objective lens OL according to the present embodiment will be described below with reference to the accompanying drawings. FIGS. 1, 5, 9, and 13 are optical path diagrams showing the configurations of microscope objective lenses OL {OL(1) to OL(4)} according to first to fourth examples. In FIGS. 1, 5, 9, and 13, each lens group is denoted by a combination of a reference sign "G" and a number (or an alphabet), and each lens is denoted by a combination of a reference sign "L" and a number (or an alphabet). In this case, each lens or the like is denoted by using combination of a reference sign and a number independently for each example to prevent complication due to increase in the kinds and magnitudes of reference signs and numbers. Accordingly, the same combination of a reference sign and a number in the examples does not necessarily mean identical components.

Among Tables 1 to 4 below, Table 1 is a table listing various data in the first example, Table 2 is a table listing various data in the second example, Table 3 is a table listing various data in the third example, and Table 4 is a table listing various data in the fourth example. In each example, aberration characteristics are calculated for the d-line (wavelength λ=587.6 nm), the C-line (wavelength λ=656.3 nm), and the F-line (wavelength λ=486.1 nm).

In each table of [General Data], β represents the magnification of the microscope objective lens. The value of f represents the focal length of the microscope objective lens. The value of NA represents the object-side numerical aperture of the microscope objective lens. The value of WD represents working distance represents the distance on the optical axis from the object to a lens surface (first surface to be described later) closest to the object side in the microscope objective lens (except for the thickness of the cover glass). The value of H1 represents the distance from the optical axis to a light beam farthest from the optical axis in the second lens group among light beams emitted from the object on the optical axis. The value of H2 represents the distance from the optical axis to a light beam farthest from the optical axis at the lens surface of the final lens on the image side among light beams emitted from the object on the optical axis. The value of vdLe represents the Abbe number of the final lens. The value of θgFLe represents the partial dispersion ratio of the final lens. The value of DLe represents the length of the final lens on the optical axis. The value of vdLp represents the Abbe number of at least one positive lens of the plurality of positive lenses in the second lens group. The value of θgFLp represents the partial dispersion ratio of the at least one positive lens of the plurality of positive lenses in the second lens group. The value of fLp represents the focal length of the at least one positive lens of the plurality of positive lenses in the second lens group.

In each table of [Lens Data], a surface number represents the order of a lens surface from the object side, R represents the radius of curvature (defined to have a positive value for a lens surface that is convex on the object side) corresponding to a surface number, D represents a lens thickness or air distance corresponding to a surface number on the optical axis, nd represents the refractive index of an optical material corresponding to a surface number at the d-line (wavelength λ=587.6 nm), vd represents the Abbe number of the optical material corresponding to a surface number with respect to the d-line, H represents the distance from the optical axis to a light beam farthest from the optical axis at a lens surface corresponding to a surface number, and θgF represents the partial dispersion ratio of the material of an optical member corresponding to a surface number. The symbol "co" for the radius of curvature indicates a plane or an opening. The refractive index nd of air=1.00000 is omitted in description.

The refractive index of the material of an optical member at the g-line (wavelength λ=435.8 nm) is represented by ng, the refractive index of the material of the optical member at the F-line (wavelength λ=486.1 nm) is represented by nF, and the refractive index of the material of the optical member at the C-line (wavelength λ=656.3 nm) is represented by nC. In this case, the partial dispersion ratio θgF of the material of the optical member is defined by the following expression (A).

$$\theta gF=(ng-nF)/(nF-nC) \quad (A)$$

Each table of [Lens Group Data] lists the first surface (surface closest to the object side) and focal length of each lens group.

Unless otherwise stated, the part "mm" is typically used for all data values such as the focal length f, the radius R of curvature, the surface distance D, and other lengths listed in the tables below, but each optical system can obtain equivalent optical performance when proportionally scaled up or down, and thus the values are not limited to the part.

The above description of the tables is common to all examples, and any duplicate description is omitted below.

First Example

The first example will be described below with reference to FIGS. 1 to 4 and Table 1. FIG. 1 is an optical path diagram showing the configuration of a microscope objective lens according to the first example. The microscope objective lens OL(1) according to the first example comprises a first lens group G1 having positive refractive power, a second lens group G2 having positive refractive power, a third lens group G3 having negative refractive power, and a fourth lens group G4 having negative refractive power, the lens groups being arranged in order from the object side along the optical axis. The space between a distal end part of the microscope objective lens OL(1) according to the first example and the cover glass CV covering the object OB is filled with immersion liquid (oil). The space between the cover glass CV and the object OB is filled with immersion liquid (oil) as well. Note that the refractive index of the immersion liquid at the d-line (wavelength λ=587.6 nm) is 1.5148. The refractive index of the cover glass CV at the d-line is 1.5244.

The first lens group G1 comprises a cemented lens formed by cementing a plano-convex positive lens L101 having a flat surface facing the object side and a negative meniscus lens L102 having a concave surface facing the object side in order from the object side along the optical axis.

The second lens group G2 comprises a positive meniscus lens L201 having a concave surface facing the object side, a cemented lens formed by cementing a negative meniscus lens L202 having a convex surface facing the object side and a biconvex positive lens L203, a cemented lens formed by cementing a biconcave negative lens L204 and a biconvex positive lens L205, a cemented lens formed by cementing a negative meniscus lens L206 having a convex surface facing the object side and a biconvex positive lens L207, a positive meniscus lens L208 having a concave surface facing the object side, and a cemented lens formed by cementing a negative meniscus lens L209 having a convex surface facing the object side, a biconvex positive lens L210, and a biconcave negative lens L211, the lenses being arranged in order from the object side along the optical axis. A lens surface of the positive lens L205 on the image side in the second lens group G2 corresponds to a lens surface through which a light beam farthest from the optical axis in the second lens group G2 among light beams emitted from the object OB on the optical axis passes. The positive meniscus lens L208 in the second lens group G2 corresponds to a positive lens that satisfies Conditional Expressions (5) to (7) described above and the like.

The third lens group G3 comprises a cemented lens formed by cementing a biconvex positive lens L301 and a biconcave negative lens L302 in order from the object side along the optical axis.

The fourth lens group G4 comprises a cemented lens formed by cementing a biconcave negative lens L401 and a biconvex positive lens L402 in order from the object side along the optical axis. The positive lens L402 in the fourth lens group G4 corresponds to the final lens Le disposed closest to the image side in the microscope objective lens OL.

The space between the second lens group G2 and the third lens group G3 can be changed in accordance with the thickness of the cover glass CV by integrally moving the third lens group G3 and the fourth lens group G4 along the optical axis. When moved along the optical axis, the third lens group G3 and the fourth lens group G4 function as what is called a correction collar and can correct aberration that changes in accordance with the thickness of the cover glass CV.

Note that the space between the positive meniscus lens L208 and the negative meniscus lens L209 in the second lens group G2 may be able to be changed in accordance with the thickness of the cover glass CV by integrally moving lenses (in other words, the cemented lens formed by cementing the negative meniscus lens L209, the positive lens L210, and the negative lens L211) on the image side of the positive meniscus lens L208, which satisfies Conditional Expressions (5) to (7) described above and the like, in the second lens group G2, the third lens group G3, and the fourth lens group G4 along the optical axis. In this case, when moved along the optical axis, the lenses on the image side of the positive meniscus lens L208 in the second lens group G2, the third lens group G3, and the fourth lens group G4 function as what is called a correction collar and can correct aberration that changes in accordance with the thickness of the cover glass CV.

Table 1 below lists data values of the microscope objective lens according to the first example. Note that the first surface is the object surface (OB).

TABLE 1

[General Data]

β = 60times
f = 3.34
NA = 1.40          WD = 0.15
H1 = 9.00          H2 = 4.67
νdLe = 24.80       θgFLe = 0.6122
DLe = 8.08
νdLp = 37.00       θgFLp = 0.5862
fLp = 70.17

[Lens Data]

| Surface Number | R | D | nd | νd | H | θgF |
|---|---|---|---|---|---|---|
| 1 | ∞ | 0.10 | 1.5148 | 40.31 | | |
| 2 | ∞ | 0.17 | 1.5244 | 54.28 | | |
| 3 | ∞ | 0.05 | 1.5148 | 40.31 | | |
| 4 | ∞ | 0.48 | 1.5182 | 58.90 | | |
| 5 | −1.801 | 3.99 | 1.9538 | 32.33 | | |
| 6 | −3.490 | 0.20 | | | | |
| 7 | −238.272 | 2.85 | 1.5932 | 67.90 | 5.68 | |
| 8 | −15.393 | 0.20 | | | 6.32 | |
| 9 | 78.562 | 1.00 | 1.6127 | 44.46 | 7.04 | |
| 10 | 15.775 | 6.96 | 1.4388 | 94.94 | 7.53 | |
| 11 | −10.917 | 0.20 | | | 7.99 | |
| 12 | −33.640 | 1.75 | 1.6541 | 39.68 | 8.00 | |
| 13 | 14.722 | 8.26 | 1.4339 | 95.25 | 8.54 | |
| 14 | −12.905 | 0.20 | | | 9.00 | |
| 15 | 22.204 | 1.00 | 1.7880 | 47.37 | 8.78 | |
| 16 | 9.945 | 5.51 | 1.5691 | 71.34 | 8.08 | |
| 17 | −89.209 | 0.20 | | | 8.02 | |
| 18 | −165.025 | 1.73 | 1.6129 | 37.00 | 7.96 | 0.5862 |
| 19 | −34.254 | 0.20 | | | 7.88 | |
| 20 | 15.433 | 1.00 | 1.6127 | 44.46 | 7.06 | |
| 21 | 7.252 | 5.15 | 1.4388 | 94.94 | 6.09 | |
| 22 | −20.439 | 1.00 | 1.8160 | 46.62 | 5.82 | |
| 23 | 18.433 | 0.20 | | | 5.44 | |
| 24 | 7.922 | 5.85 | 1.8503 | 32.35 | | |
| 25 | −10.069 | 3.31 | 1.8548 | 24.80 | | |
| 26 | 3.696 | 2.07 | | | | |
| 27 | −4.379 | 2.35 | 1.9165 | 31.60 | | |
| 28 | 163.784 | 8.08 | 1.8548 | 24.80 | 2.99 | 0.6122 |
| 29 | −9.674 | — | | | 4.67 | |

[Lens Group Data]

| Group | First surface | Focal length |
|---|---|---|
| G1 | 4 | 6.01 |
| G2 | 7 | 12.07 |
| G3 | 24 | −631.75 |
| G4 | 27 | −55.56 |

Figure 2:
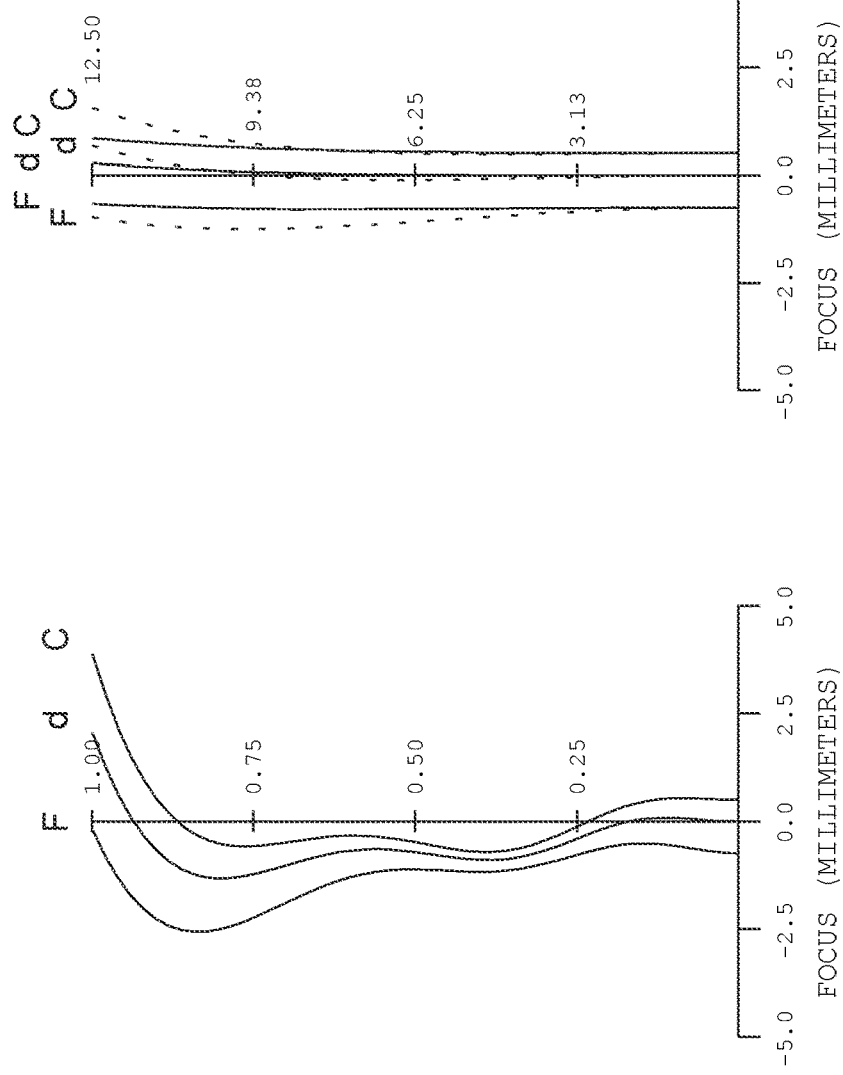
FIG. 2 shows a variety of aberration diagrams of the microscope objective lens according to the first example.
Figure 3:
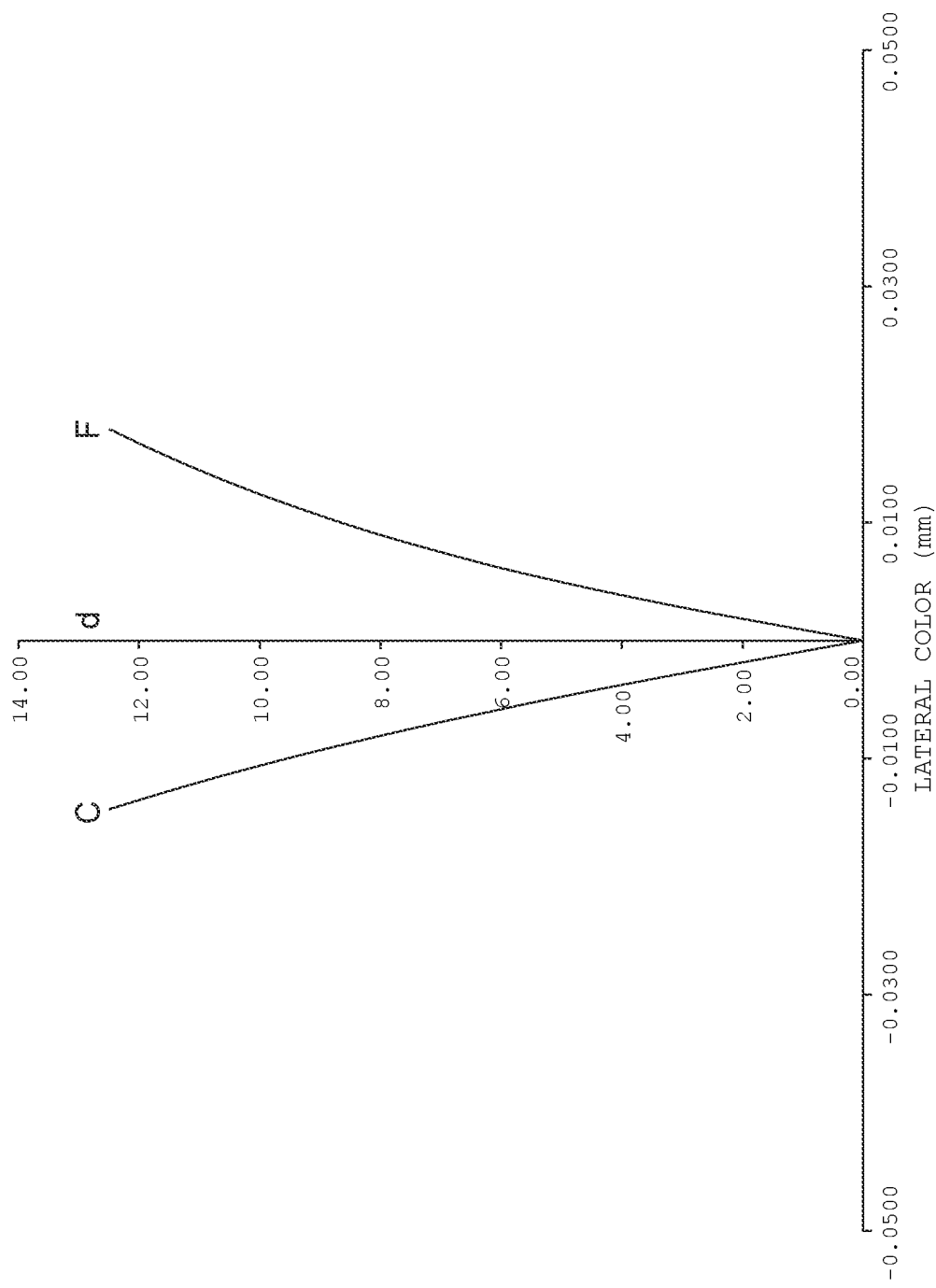
FIG. 3 is a chromatic aberration diagram of the microscope objective lens according to the first example.
Figure 4:
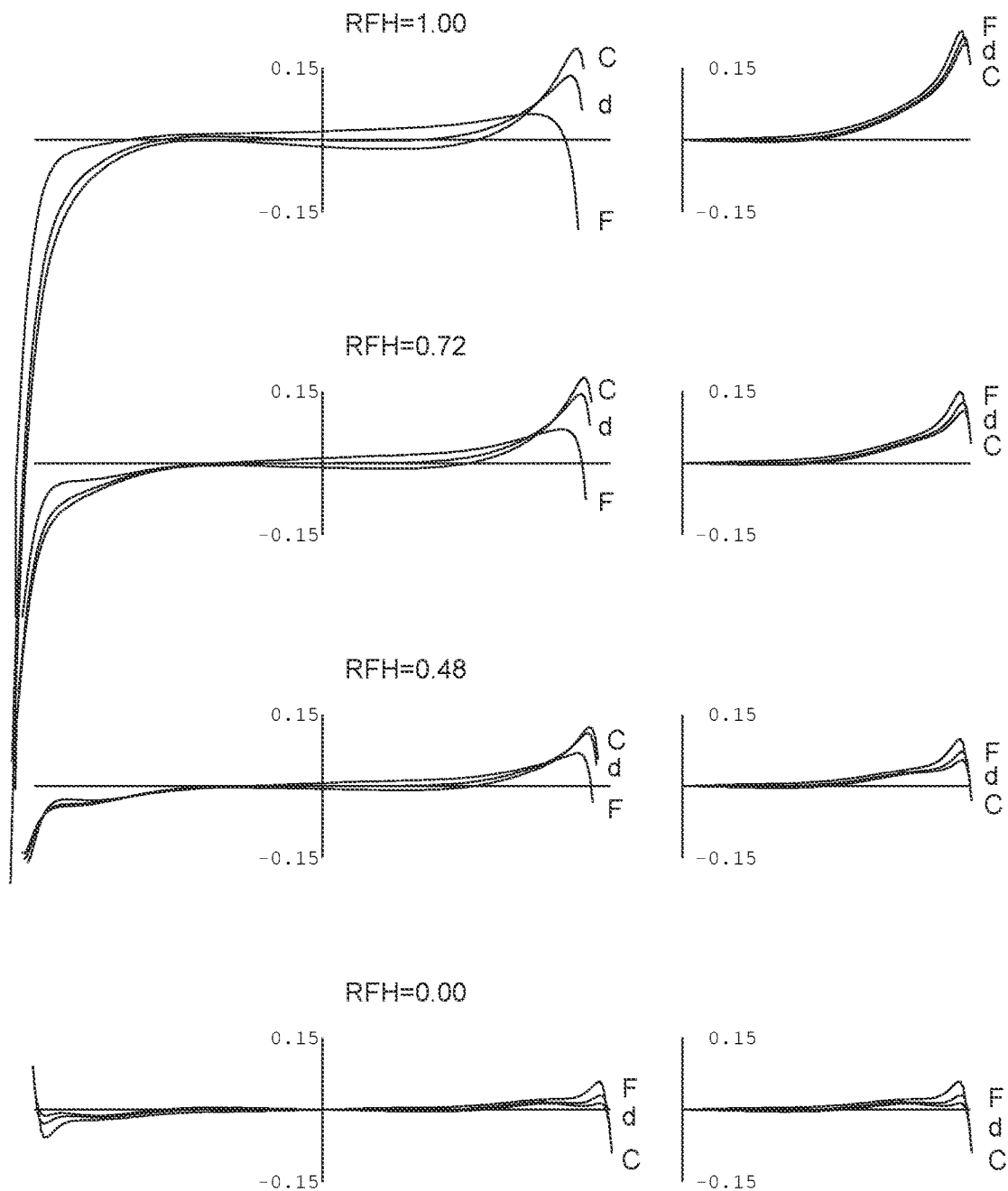
FIG. 4 is a coma aberration diagram of the microscope objective lens according to the first example.

FIG. 2 is a diagram showing a variety of aberrations (spherical aberration, curvature of field, and distortion) of the microscope objective lens according to the first example. FIG. 3 is a diagram showing chromatic aberration of magnification (lateral chromatic aberration) of the microscope objective lens according to the first example. FIG. 4 is a diagram showing coma aberration (meridional coma aberration and sagittal coma aberration) of the microscope objective lens according to the first example. Note that the aberration diagrams show the variety of aberrations in a state in which the second objective lens is assembled to the microscope objective lens. In the aberration diagrams in FIGS. 2 to 4, d, C, and F denote the variety of aberrations at the d-line (wavelength λ=587.6 nm), the C-line (wavelength λ=656.3 nm), and the F-line (wavelength λ=486.1 nm), respectively. In the spherical aberration diagram, the vertical axis represents a value normalized to the maximum value of the entrance pupil radius as 1, and the horizontal axis represents the value [mm] of aberration of a light beam. In the aberration diagram showing curvature of field, a solid line represents the meridional image surface for a wavelength, and a dashed line represents the sagittal image surface for a wavelength. In the aberration diagram showing curvature of field, the vertical axis represents the image height [mm], and the horizontal axis represents the value [mm] of aberration. In the distortion diagram (distortion), the vertical axis represents the image height [mm], and the horizontal axis represents the ratio of aberration in percentage (%). In the aberration diagram showing chromatic aberration of magnification, the vertical axis represents the image height [mm], and the horizontal axis represents the value [mm] of aberration. Each coma aberration diagram shows the value of aberration for the relative field height RFH of 0.00 to 1.00. Note that the same reference signs as in the present example are also used in the aberration diagrams of each example described below, and duplicate description thereof is omitted.

From the aberration diagrams, it can be understood that the microscope objective lens according to the first example has a variety of aberrations, such as chromatic aberration of magnification, excellently corrected and has excellent imaging performance.

Second Example

Figure 5:
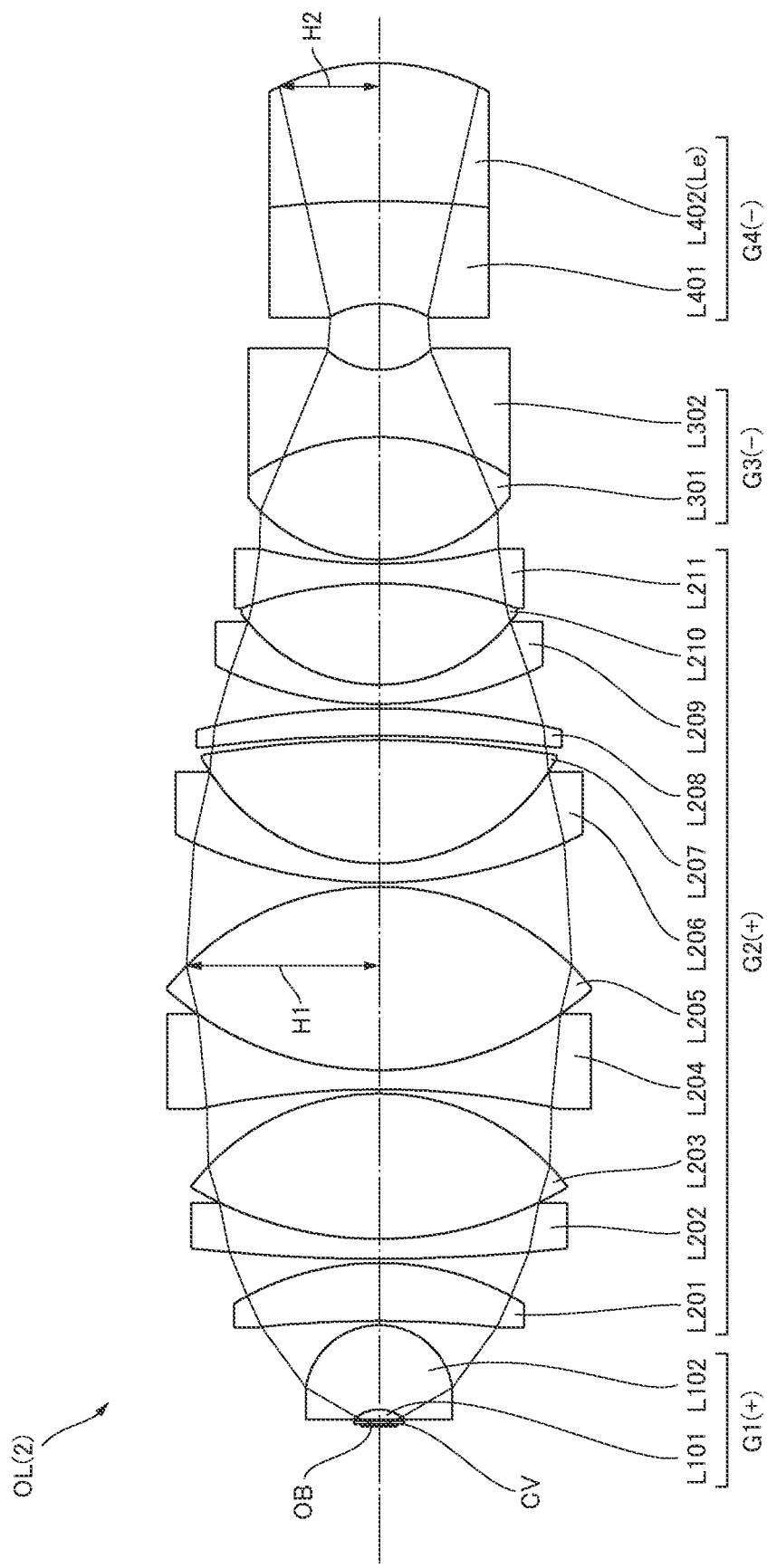
FIG. 5 is a cross-sectional view showing the configuration of a microscope objective lens according to a second example.

The second example will be described below with reference to FIGS. 5 to 8 and Table 2. FIG. 5 is an optical path diagram showing the configuration of a microscope objective lens according to the second example. The microscope objective lens OL(2) according to the second example comprises a first lens group G1 having positive refractive power, a second lens group G2 having positive refractive power, a third lens group G3 having negative refractive power, and a fourth lens group G4 having negative refractive power, the lens groups being arranged in order from the object side along the optical axis. The space between a distal end part of the microscope objective lens OL(2) according to the second example and the cover glass CV covering the object OB is filled with immersion liquid (oil). The space between the cover glass CV and the object OB is filled with immersion liquid (oil) as well. Note that the refractive index of the immersion liquid at the d-line (wavelength λ=587.6 nm) is 1.5148. The refractive index of the cover glass CV at the d-line is 1.5244.

In the second example, the first lens group G1, the second lens group G2, and the third lens group G3 are configured in the same manner as in the first example and thus denoted by the same reference signs as in the first example, and detailed description of these lenses is omitted. In the present example, a lens surface of the positive lens L205 on the image side in the second lens group G2 corresponds to a lens surface through which a light beam farthest from the optical axis in the second lens group G2 among light beams emitted from the object OB on the optical axis passes. The positive meniscus lens L208 in the second lens group G2 corresponds to a positive lens that satisfies Conditional Expressions (5) to (7) described above and the like.

The fourth lens group G4 comprises a cemented lens formed by cementing a negative meniscus lens L401 having a concave surface facing the object side and a positive meniscus lens L402 having a concave surface facing the object side in order from the object side along the optical axis. The positive meniscus lens L402 in the fourth lens group G4 corresponds to the final lens Le disposed closest to the image side in the microscope objective lens OL.

The space between the second lens group G2 and the third lens group G3 can be changed in accordance with the thickness of the cover glass CV by integrally moving the third lens group G3 and the fourth lens group G4 along the optical axis. When moved along the optical axis, the third lens group G3 and the fourth lens group G4 function as what is called a correction collar and can correct aberration that changes in accordance with the thickness of the cover glass CV.

Note that the space between the positive meniscus lens L208 and the negative meniscus lens L209 in the second lens group G2 may be able to be changed in accordance with the thickness of the cover glass CV by integrally moving lenses (in other words, the cemented lens formed by cementing the negative meniscus lens L209, the positive lens L210, and the negative lens L211) on the image side of the positive meniscus lens L208 that satisfies Conditional Expressions (5) to (7) described above and the like in the second lens group G2, the third lens group G3, and the fourth lens group G4 along the optical axis. In this case, when moved along the optical axis, the lenses on the image side of the positive meniscus lens L208 in the second lens group G2, the third lens group G3, and the fourth lens group G4 function as what is called a correction collar and can correct aberration that changes in accordance with the thickness of the cover glass CV.

Table 2 below lists data values of the microscope objective lens according to the second example. Note that the first surface is the object surface (OB).

TABLE 2

[General Data]

β = 60times
f = 3.33
NA = 1.42  WD = 0.15
H1 = 9.06  H2 = 4.68
νdLe = 25.15  θgFLe = 0.6102
DLe = 6.50
νdLp = 27.35  θgFLp = 0.6319
fLp = 128.46

[Lens Data]

| Surface Number | R | D | nd | νd | H | θgF |
|---|---|---|---|---|---|---|
| 1 | ∞ | 0.10 | 1.5148 | 40.31 | | |
| 2 | ∞ | 0.17 | 1.5244 | 54.28 | | |
| 3 | ∞ | 0.05 | 1.5148 | 40.31 | | |
| 4 | ∞ | 0.48 | 1.5182 | 58.90 | | |
| 5 | −1.801 | 3.98 | 1.9538 | 32.33 | | |
| 6 | −3.490 | 0.20 | | | | |
| 7 | −53.550 | 2.73 | 1.5932 | 67.90 | 5.54 | |
| 8 | −13.100 | 0.20 | | | 6.20 | |
| 9 | 80.000 | 0.93 | 1.6127 | 44.46 | 7.04 | |
| 10 | 17.298 | 6.84 | 1.4388 | 94.94 | 7.50 | |
| 11 | −11.149 | 0.20 | | | 8.02 | |
| 12 | −39.599 | 0.90 | 1.6541 | 39.68 | 8.09 | |
| 13 | 15.062 | 8.64 | 1.4339 | 95.25 | 8.52 | |

TABLE 2-continued

| 14 | −12.884 | 0.20 | | | 9.06 | |
|---|---|---|---|---|---|---|
| 15 | 21.270 | 0.90 | 1.7880 | 47.37 | 8.71 | |
| 16 | 9.501 | 5.80 | 1.5691 | 71.34 | 7.95 | |
| 17 | −49.451 | 0.20 | | | 7.89 | |
| 18 | −63.109 | 1.30 | 1.6638 | 27.35 | 7.81 | 0.6319 |
| 19 | −36.566 | 0.20 | | | 7.74 | |
| 20 | 17.265 | 0.91 | 1.6127 | 44.46 | 7.00 | |
| 21 | 7.928 | 4.77 | 1.4388 | 94.94 | 6.17 | |
| 22 | −18.436 | 0.92 | 1.8160 | 46.62 | 5.95 | |
| 23 | 22.698 | 0.20 | | | 5.62 | |
| 24 | 7.950 | 5.77 | 1.8503 | 32.35 | | |
| 25 | −11.102 | 3.15 | 1.8548 | 24.80 | | |
| 26 | 3.629 | 3.11 | | | | |
| 27 | −4.692 | 4.84 | 1.9165 | 31.60 | | |
| 28 | −44.290 | 6.50 | 1.8545 | 25.15 | 3.45 | 0.6102 |
| 29 | −10.482 | — | | | 4.68 | |

[Lens Group Data]

| Group | First surface | Focal length |
|---|---|---|
| G1 | 4 | 6.03 |
| G2 | 7 | 12.12 |
| G3 | 24 | −131.43 |
| G4 | 27 | −61.23 |

Figure 6:
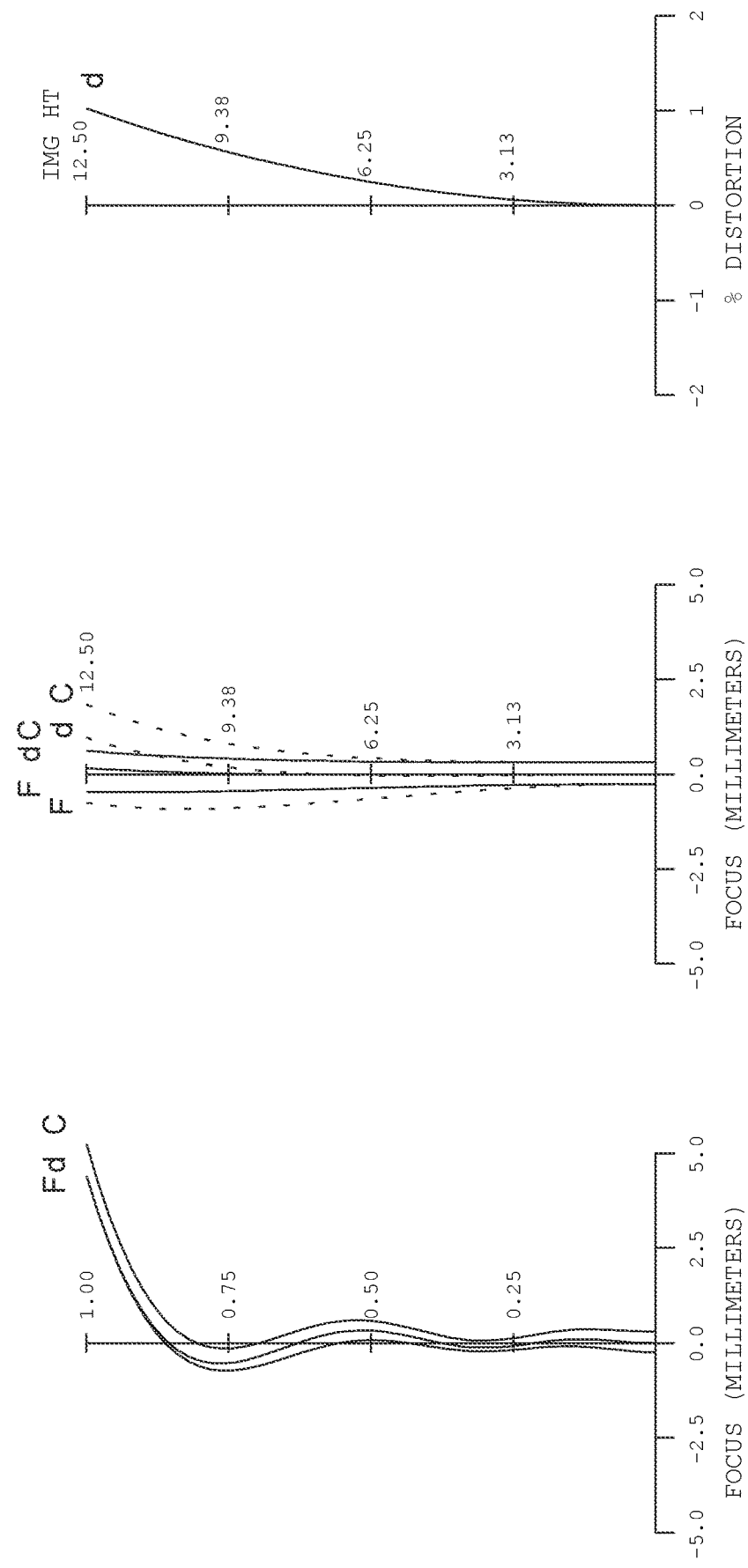
FIG. 6 shows a variety of aberration diagrams of the microscope objective lens according to the second example.
Figure 7:
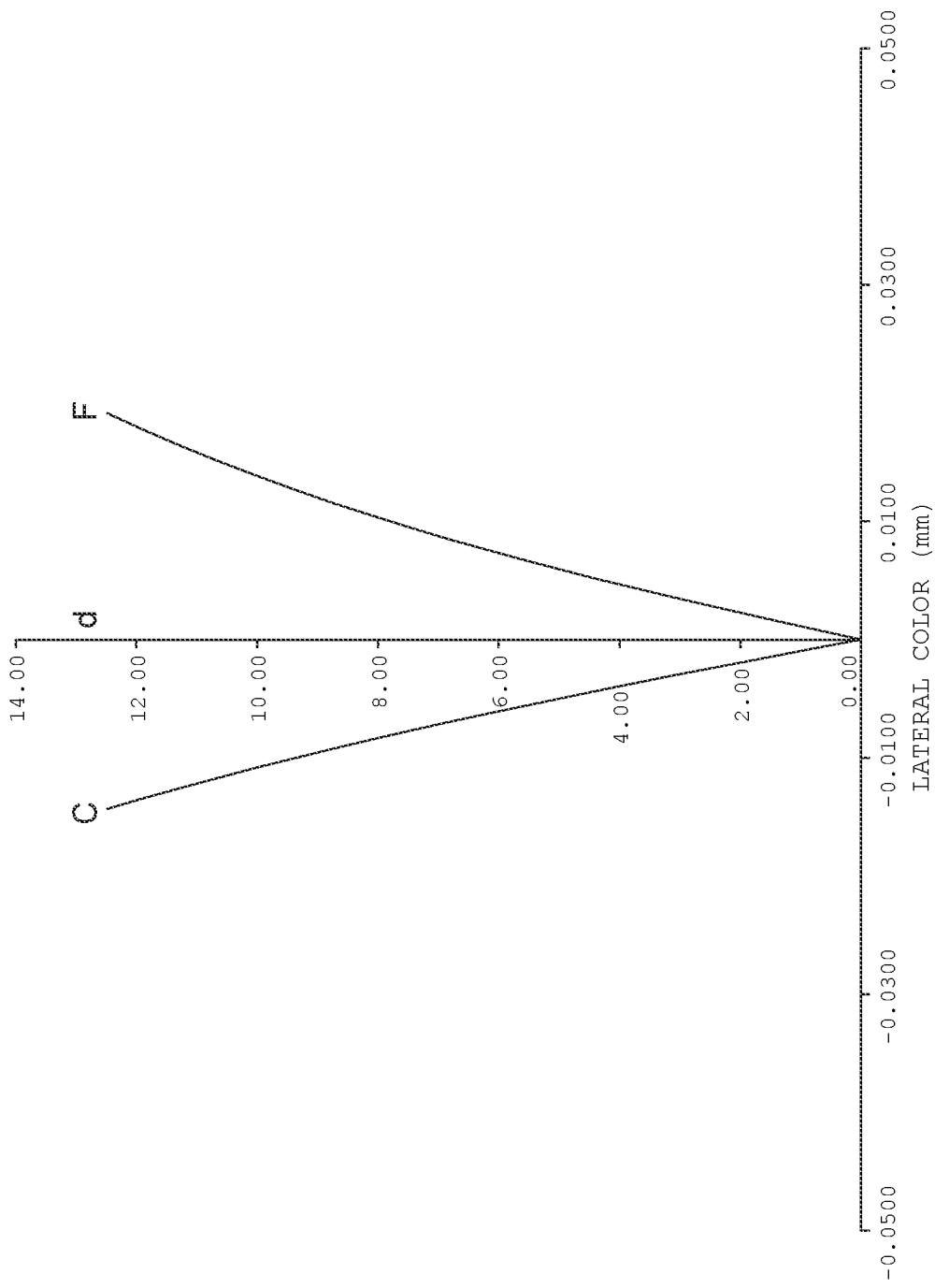
FIG. 7 is a chromatic aberration diagram of the microscope objective lens according to the second example.

FIG. 6 is a diagram showing a variety of aberrations (spherical aberration, curvature of field, and distortion) of the microscope objective lens according to the second example. FIG. 7 is a diagram showing chromatic aberration of magnification (transverse chromatic aberration) of the microscope objective lens according to the second example. FIG. 8 is a diagram showing coma aberration (meridional coma aberration and sagittal coma aberration) of the microscope objective lens according to the second example. From the aberration diagrams, it can be understood that the microscope objective lens according to the second example has a variety of aberrations, such as chromatic aberration of magnification, excellently corrected and has excellent imaging performance.

Third Example

Figure 9:
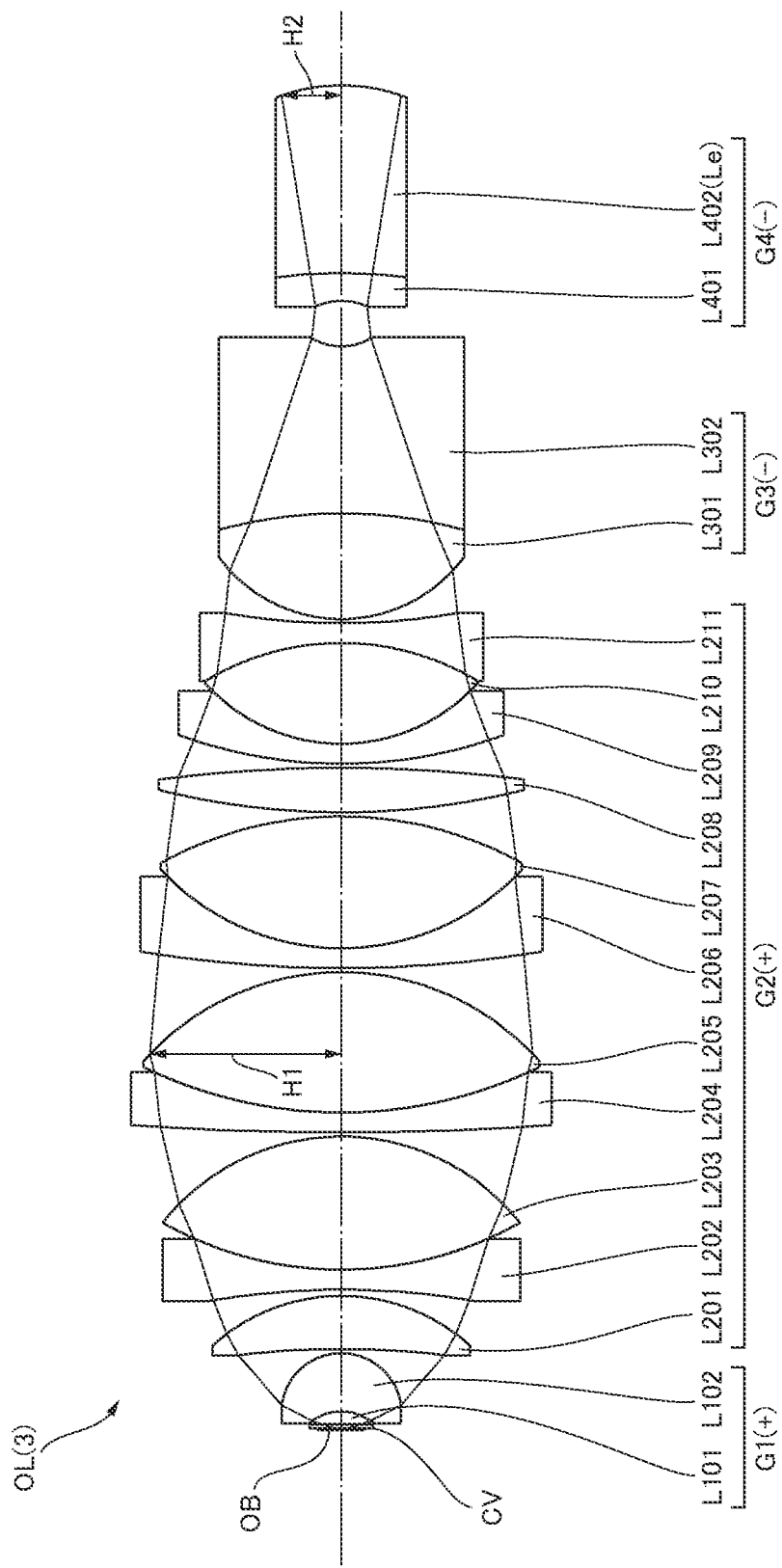
FIG. 9 is a cross-sectional view showing the configuration of a microscope objective lens according to a third example.

The third example will be described below with reference to FIGS. 9 to 12 and Table 3. FIG. 9 is an optical path diagram showing the configuration of a microscope objective lens according to the third example. The microscope objective lens OL(3) according to the third example comprises a first lens group G1 having positive refractive power, a second lens group G2 having positive refractive power, a third lens group G3 having negative refractive power, and a fourth lens group G4 having negative refractive power, the lens groups being arranged in order from the object side along the optical axis. The space between a distal end part of the microscope objective lens OL(3) according to the third example and the cover glass CV covering the object OB is filled with immersion liquid (oil). The space between the cover glass CV and the object OB is filled with immersion liquid (oil) as well. Note that the refractive index of the immersion liquid at the d-line (wavelength λ=587.6 nm) is 1.5148. The refractive index of the cover glass CV at the d-line is 1.5244.

In the third example, the first lens group G1 and the third lens group G3 are configured in the same manner as in the first example and thus denoted by the same reference signs as in the first example, and detailed description of these lenses is omitted. The second lens group G2 comprises a positive meniscus lens L201 having a concave surface facing the object side, a cemented lens formed by cementing a biconcave negative lens L202 and a biconvex positive lens L203, a cemented lens formed by cementing a negative meniscus lens L204 having a convex surface facing the object side and a biconvex positive lens L205, a cemented lens formed by cementing a negative meniscus lens L206 having a convex surface facing the object side and a biconvex positive lens L207, a biconvex positive lens L208, and a cemented lens formed by cementing a negative meniscus lens L209 having a convex surface facing the object side, a biconvex positive lens L210, and a biconcave negative lens L211, the lenses being arranged in order from the object side along the optical axis. A lens surface of the positive lens L205 on the image side in the second lens group G2 corresponds to a lens surface through which a light beam farthest from the optical axis in the second lens group G2 among light beams emitted from the object OB on the optical axis passes. The positive lens L208 in the second lens group G2 corresponds to a positive lens that satisfies Conditional Expressions (5) to (7) described above and the like.

The fourth lens group G4 comprises a cemented lens formed by cementing a negative meniscus lens L401 having a concave surface facing the object side and a positive meniscus lens L402 having a concave surface facing the object side in order from the object side along the optical axis. The positive meniscus lens L402 in the fourth lens group G4 corresponds to the final lens Le disposed closest to the image side in the microscope objective lens OL.

The space between the second lens group G2 and the third lens group G3 can be changed in accordance with the thickness of the cover glass CV by integrally moving the third lens group G3 and the fourth lens group G4 along the optical axis. When moved along the optical axis, the third lens group G3 and the fourth lens group G4 function as what is called a correction collar and can correct aberration that changes in accordance with the thickness of the cover glass CV.

Note that the space between the positive lens L208 and the negative meniscus lens L209 in the second lens group G2 may be able to be changed in accordance with the thickness of the cover glass CV by integrally moving lenses (in other words, the cemented lens formed by cementing the negative meniscus lens L209, the positive lens L210, and the negative lens L211) on the image side of the positive lens L208 that satisfies Conditional Expressions (5) to (7) described above and the like in the second lens group G2, the third lens group G3, and the fourth lens group G4 along the optical axis. In this case, when moved along the optical axis, the lenses on the image side of the positive lens L208 in the second lens group G2, the third lens group G3, and the fourth lens group G4, function as what is called a correction collar and can correct aberration that changes in accordance with the thickness of the cover glass CV.

Table 3 below lists data values of the microscope objective lens according to the third example. Note that the first surface is the object surface (OB).

TABLE 3

[General Data]

| | |
|---|---|
| β = 100times | |
| f = 2.00 | |
| NA = 1.45 | WD = 0.14 |
| H1 = 9.16 | H2 = 2.85 |
| vdLe = 24.80 | θgFLe = 0.6122 |
| DLe = 9.01 | |
| vdLp = 27.79 | θgFLp = 0.6095 |
| fLp = 32.35 | |

TABLE 3-continued

[Lens Data]

| Surface Number | R | D | nd | vd | H | θgF |
|---|---|---|---|---|---|---|
| 1 | ∞ | 0.10 | 1.5148 | 40.31 | | |
| 2 | ∞ | 0.17 | 1.5244 | 54.28 | | |
| 3 | ∞ | 0.04 | 1.5148 | 40.31 | | |
| 4 | ∞ | 0.60 | 1.5400 | 59.46 | | |
| 5 | −2.353 | 2.79 | 1.9538 | 32.33 | | |
| 6 | −2.884 | 0.20 | | | | |
| 7 | −40.868 | 2.54 | 1.5924 | 68.37 | 4.94 | |
| 8 | −9.178 | 0.30 | | | 5.48 | |
| 9 | −37.924 | 0.96 | 1.6127 | 44.46 | 6.13 | |
| 10 | 17.353 | 6.38 | 1.4343 | 94.77 | 7.05 | |
| 11 | −10.916 | 0.20 | | | 7.77 | |
| 12 | 145.940 | 0.95 | 1.7205 | 34.71 | 8.66 | |
| 13 | 21.720 | 6.73 | 1.4339 | 95.25 | 8.95 | |
| 14 | −12.641 | 0.20 | | | 9.16 | |
| 15 | 59.190 | 0.95 | 1.7410 | 52.64 | 8.74 | |
| 16 | 11.812 | 6.32 | 1.4339 | 95.25 | 8.32 | |
| 17 | −17.813 | 0.20 | | | 8.38 | |
| 18 | 36.385 | 2.13 | 1.7408 | 27.79 | 7.95 | 0.6095 |
| 19 | −68.478 | 0.20 | | | 7.81 | |
| 20 | 22.711 | 0.96 | 1.7432 | 49.34 | 7.07 | |
| 21 | 8.793 | 4.83 | 1.4388 | 94.94 | 6.17 | |
| 22 | −12.569 | 0.95 | 1.6910 | 54.82 | 5.95 | |
| 23 | 31.942 | 0.20 | | | 5.56 | |
| 24 | 7.299 | 5.07 | 1.6230 | 58.16 | | |
| 25 | −22.161 | 8.01 | 1.8548 | 24.80 | | |
| 26 | 2.713 | 2.18 | | | | |
| 27 | −2.969 | 1.33 | 1.9037 | 31.34 | | |
| 28 | −24.035 | 9.01 | 1.8548 | 24.80 | 1.49 | 0.6122 |
| 29 | −8.581 | — | | | 2.85 | |

[Lens Group Data]

| Group | First surface | Focal length |
|---|---|---|
| G1 | 4 | 4.20 |
| G2 | 7 | 11.27 |
| G3 | 24 | −20.92 |
| G4 | 27 | −28.48 |

Figure 10:
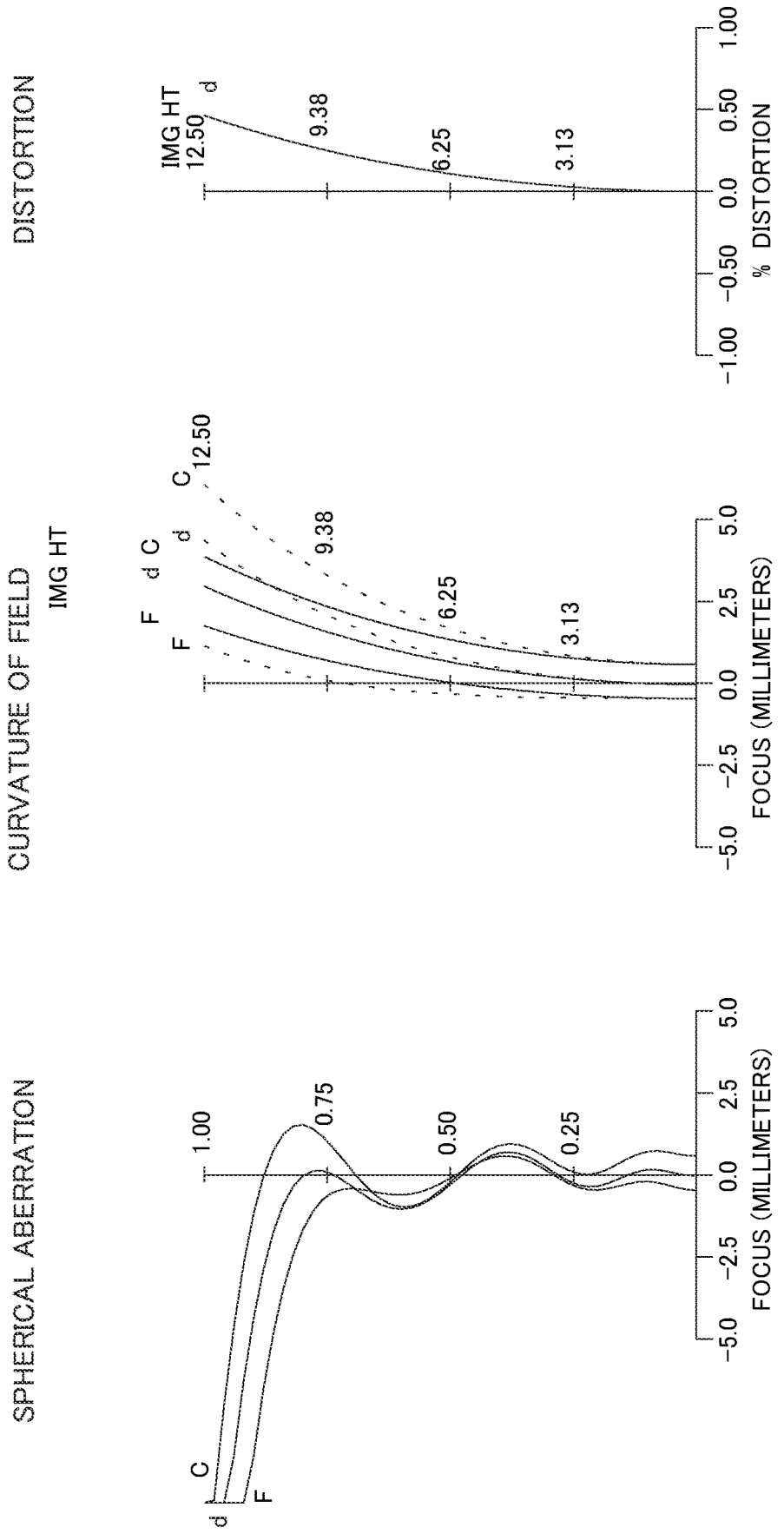
FIG. 10 shows a variety of aberration diagrams of the microscope objective lens according to the third example.
Figure 11:
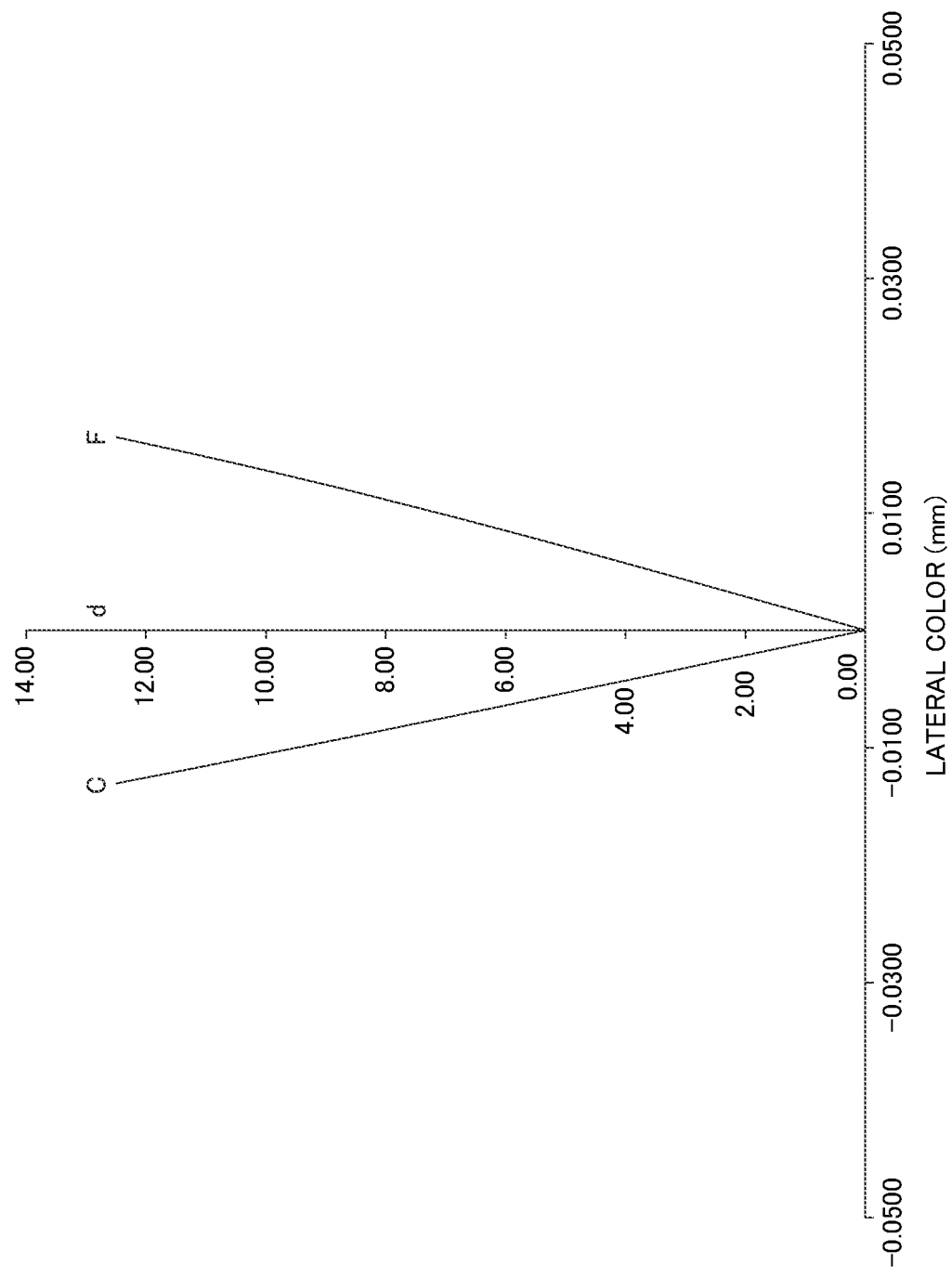
FIG. 11 is a chromatic aberration diagram of the microscope objective lens according to the third example.

FIG. 10 is a diagram showing a variety of aberrations (spherical aberration, curvature of field, and distortion) of the microscope objective lens according to the third example. FIG. 11 is a diagram showing chromatic aberration of magnification (transverse chromatic aberration) of the microscope objective lens according to the third example. FIG. 12 is a diagram showing coma aberration (meridional coma aberration and sagittal coma aberration) of the microscope objective lens according to the third example. From the aberration diagrams, it can be understood that the microscope objective lens according to the third example has a variety of aberrations, such as chromatic aberration of magnification, excellently corrected and has excellent imaging performance.

Fourth Example

Figure 13:
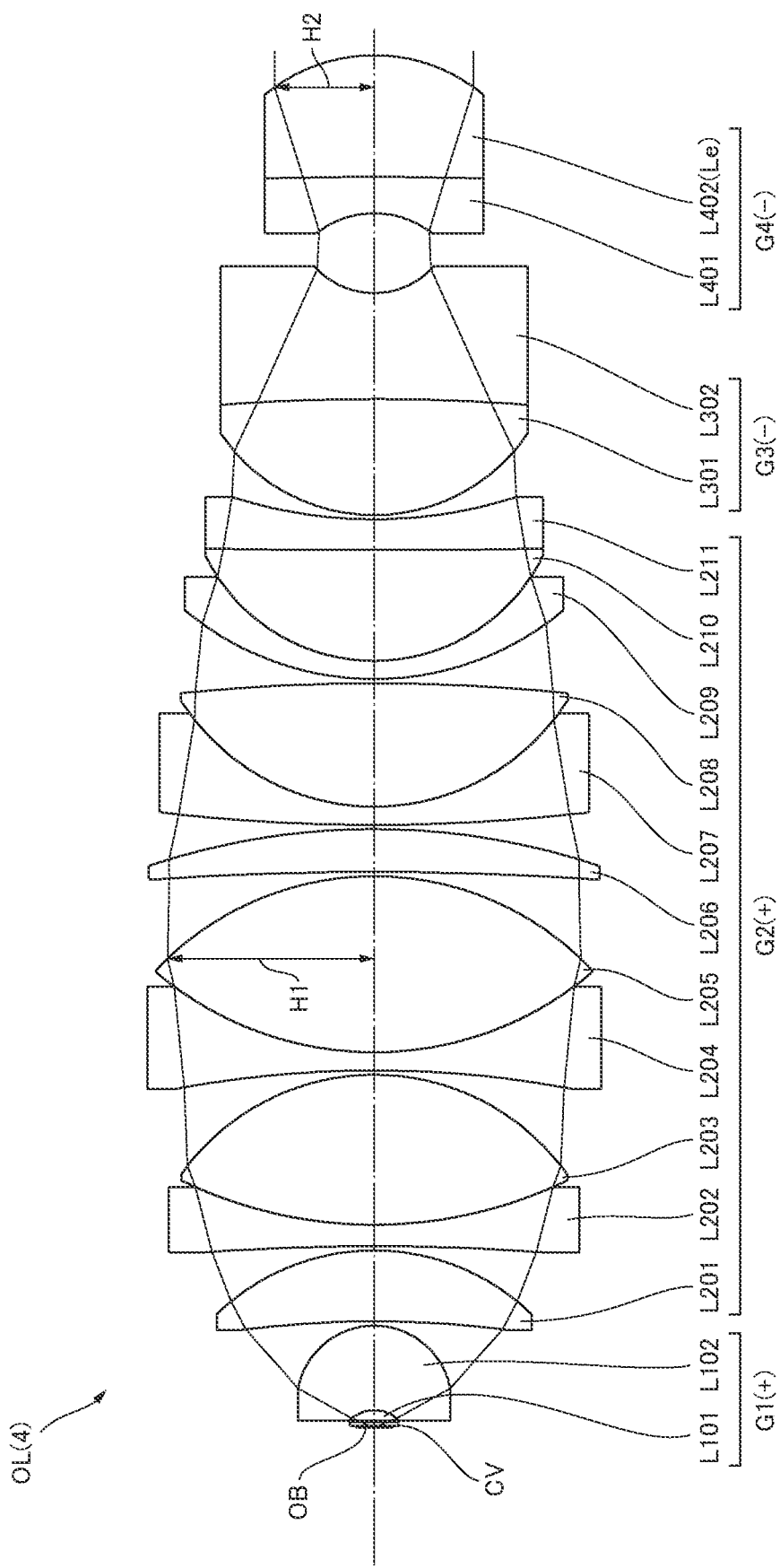
FIG. 13 is a cross-sectional view showing the configuration of a microscope objective lens according to a fourth example.

The fourth example will be described below with reference to FIGS. 13 to 16 and Table 4. FIG. 13 is an optical path diagram showing the configuration of a microscope objective lens according to the fourth example. The microscope objective lens OL(4) according to the fourth example comprises a first lens group G1 having positive refractive power, a second lens group G2 having positive refractive power, a third lens group G3 having negative refractive power, and a fourth lens group G4 having negative refractive power, the lens groups being arranged in order from the object side along the optical axis. The space between a distal end part of the microscope objective lens OL(4) according to the fourth example and the cover glass CV covering the object OB is filled with immersion liquid (oil). The space between the cover glass CV and the object OB is filled with immersion liquid (oil) as well. Note that the refractive index of the immersion liquid at the d-line (wavelength λ=587.6 nm) is 1.5148. The refractive index of the cover glass CV at the d-line is 1.5244.

In the fourth example, the first lens group G1 and the third lens group G3 are configured in the same manner as in the first example and thus denoted by the same reference signs as in the first example, and detailed description of these lenses is omitted. The second lens group G2 comprises a positive meniscus lens L201 having a concave surface facing the object side, a cemented lens formed by cementing a biconcave negative lens L202 and a biconvex positive lens L203, a cemented lens formed by cementing a biconcave negative lens L204 and a biconvex positive lens L205, a positive meniscus lens L206 having a concave surface facing the object side, a cemented lens formed by cementing a negative meniscus lens L207 having a convex surface facing the object side and a biconvex positive lens L208, and a cemented lens formed by cementing a negative meniscus lens L209 having a convex surface facing the object side, a positive meniscus lens L210 having a convex surface facing the object side, and a negative meniscus lens L211 having a convex surface facing the object side, the lenses being arranged in order from the object side along the optical axis. A lens surface of the positive lens L205 on the image side in the second lens group G2 corresponds to a lens surface through which a light beam farthest from the optical axis in the second lens group G2 among light beams emitted from the object OB on the optical axis passes. The positive meniscus lens L206 in the second lens group G2 corresponds to a positive lens that satisfies Conditional Expressions (5) to (7) described above and the like.

The fourth lens group G4 comprises a cemented lens formed by cementing a negative meniscus lens L401 having a concave surface facing the object side and a positive meniscus lens L402 having a concave surface facing the object side in order from the object side along the optical axis. The positive meniscus lens L402 in the fourth lens group G4 corresponds to the final lens Le disposed closest to the image side in the microscope objective lens OL.

The space between the second lens group G2 and the third lens group G3 can be changed in accordance with the thickness of the cover glass CV by integrally moving the third lens group G3 and the fourth lens group G4 along the optical axis. When moved along the optical axis, the third lens group G3 and the fourth lens group G4 function as what is called a correction collar and can correct aberration that changes in accordance with the thickness of the cover glass CV.

Note that the space between the positive meniscus lens L206 and the negative meniscus lens L207 in the second lens group G2 may be able to be changed in accordance with the thickness of the cover glass CV by integrally moving lenses (in other words, the cemented lens formed by cementing the negative meniscus lens L207 and the positive lens L208, and the cemented lens formed by cementing the negative meniscus lens L209, the positive meniscus lens L210, and the negative meniscus lens L211) on the image side of the positive meniscus lens L206 that satisfies Conditional Expressions (5) to (7) described above and the like in the second lens group G2, the third lens group G3, and the fourth lens group G4 along the optical axis. In this case, when moved along the optical axis, the lenses on the image side of the positive meniscus lens L206 in the second lens group G2, the third lens group G3, and the fourth lens group G4 function as what is called a correction collar and can correct aberration that changes in accordance with the thickness of the cover glass CV.

Table 4 below lists data values of the microscope objective lens according to the fourth example. Note that the first surface is the object surface (OB).

TABLE 4

[General Data]

β = 60times
f = 3.32
NA = 1.40                  WD = 0.14
H1 = 9.65                  H2 = 4.64
vdLe = 24.80               θgFLe = 0.6122
DLe = 5.67
vdLp = 24.71               θgFLp = 0.6291
fLp = 55.54

[Lens Data]

| Surface Number | R | D | nd | vd | H | θgF |
|---|---|---|---|---|---|---|
| 1 | ∞ | 0.10 | 1.5148 | 40.31 | | |
| 2 | ∞ | 0.17 | 1.5244 | 54.28 | | |
| 3 | ∞ | 0.05 | 1.5148 | 40.31 | | |
| 4 | ∞ | 0.50 | 1.5182 | 58.90 | | |
| 5 | −1.609 | 3.94 | 1.9538 | 32.33 | | |
| 6 | −3.613 | 0.20 | | | | |
| 7 | −48.280 | 3.31 | 1.5932 | 67.90 | 5.99 | |
| 8 | −10.543 | 0.20 | | | 6.68 | |
| 9 | −106.359 | 1.00 | 1.6127 | 44.46 | 7.56 | |
| 10 | 20.636 | 7.00 | 1.4388 | 94.94 | 8.34 | |
| 11 | −11.034 | 0.20 | | | 8.70 | |
| 12 | −50.111 | 0.85 | 1.6541 | 39.68 | 8.86 | |
| 13 | 15.708 | 8.21 | 1.4339 | 95.25 | 9.32 | |
| 14 | −14.005 | 0.20 | | | 9.65 | |
| 15 | −150.000 | 2.00 | 1.7558 | 24.71 | 9.56 | 0.6291 |
| 16 | −32.984 | 0.20 | | | 9.57 | |
| 17 | 86.174 | 0.85 | 1.7880 | 47.37 | 9.12 | |
| 18 | 10.681 | 5.75 | 1.5691 | 71.34 | 8.38 | |
| 19 | −88.353 | 0.20 | | | 8.34 | |
| 20 | 13.721 | 0.85 | 1.6127 | 44.46 | 8.01 | |
| 21 | 8.768 | 5.17 | 1.4388 | 94.94 | 7.31 | |
| 22 | 407.881 | 1.44 | 1.8160 | 46.62 | 7.04 | |
| 23 | 21.613 | 0.20 | | | 6.63 | |
| 24 | 8.628 | 5.41 | 1.7880 | 47.35 | | |
| 25 | −97.965 | 4.95 | 1.8548 | 24.80 | | |
| 26 | 3.733 | 3.72 | | | | |
| 27 | −4.355 | 1.70 | 1.9165 | 31.60 | | |
| 28 | −140.078 | 5.67 | 1.8548 | 24.80 | 3.32 | 0.6122 |
| 29 | −7.944 | — | | | 4.64 | |

[Lens Group Data]

| Group | First surface | Focal length |
|---|---|---|
| G1 | 4 | 7.27 |
| G2 | 7 | 13.15 |
| G3 | 24 | −51.56 |
| G4 | 27 | −76.08 |

Figure 14:
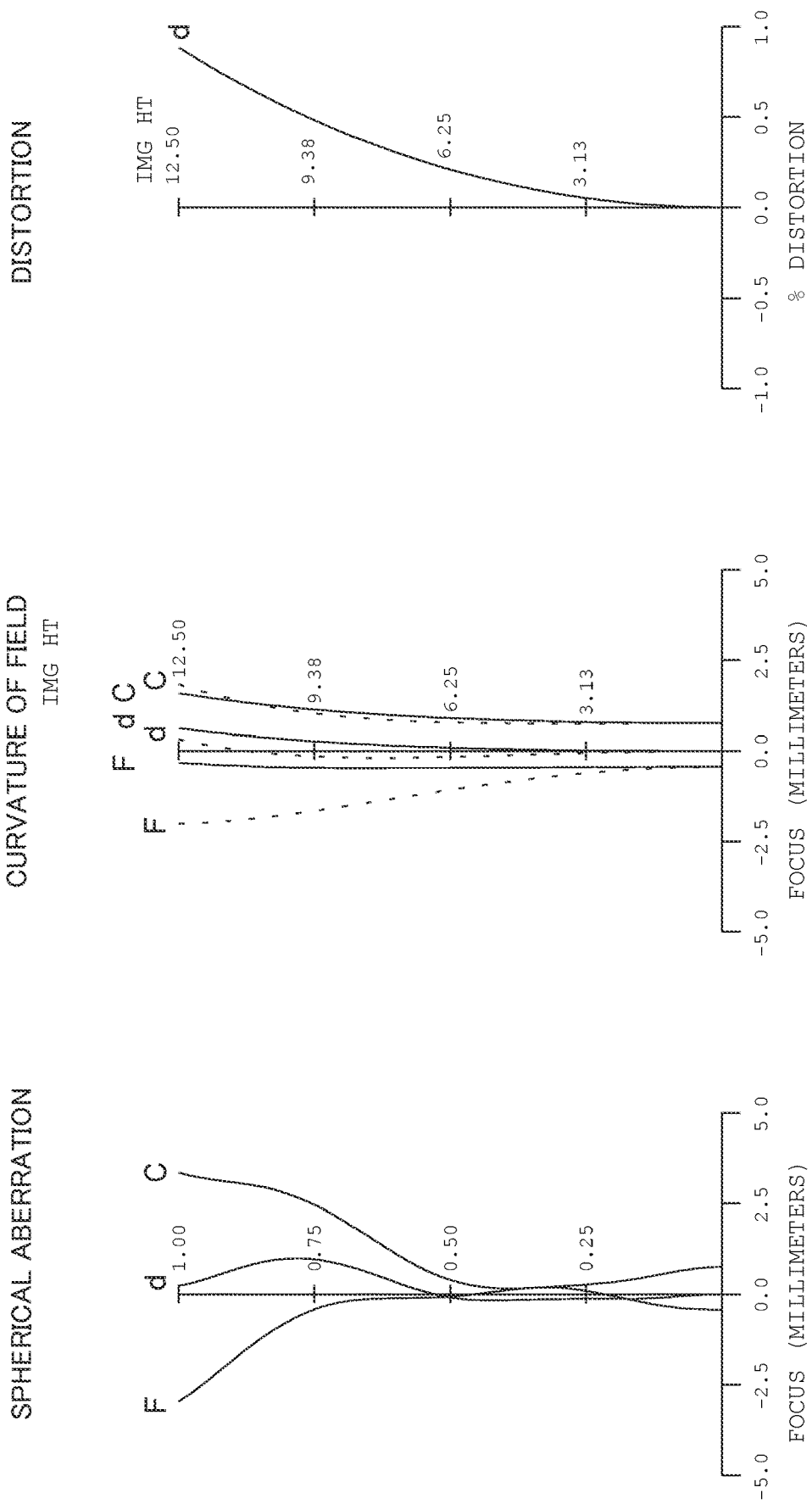
FIG. 14 shows a variety of aberration diagrams of the microscope objective lens according to the fourth example.
Figure 15:
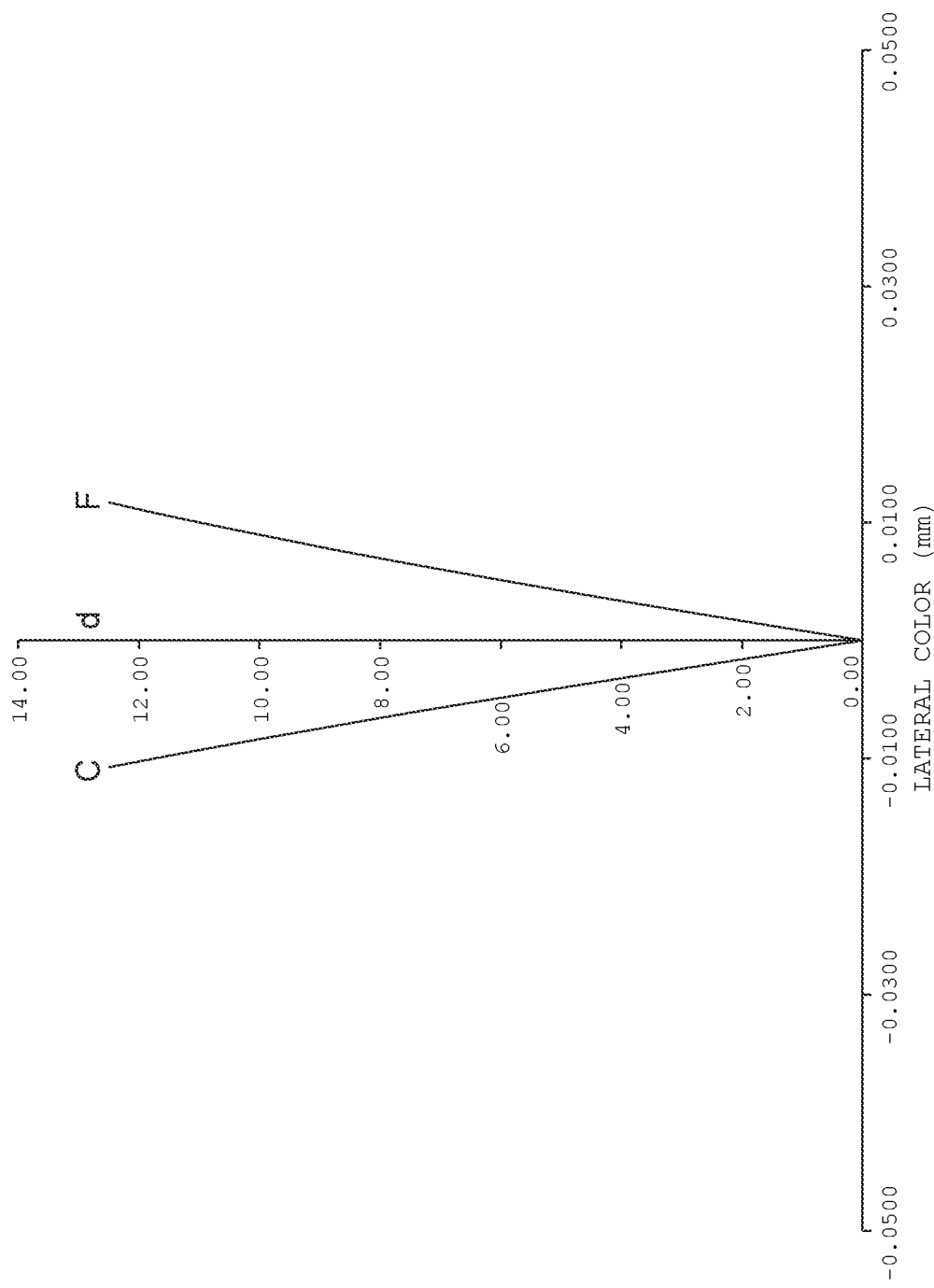
FIG. 15 is a chromatic aberration diagram of the microscope objective lens according to the fourth example.

FIG. 14 is a diagram showing a variety of aberrations (spherical aberration, curvature of field, and distortion) of the microscope objective lens according to the fourth example. FIG. 15 is a diagram showing chromatic aberration of magnification (transverse chromatic aberration) of the microscope objective lens according to the fourth example. FIG. 16 is a diagram showing coma aberration (meridional coma aberration and sagittal coma aberration) of the microscope objective lens according to the fourth example. From the aberration diagrams, it can be understood that the microscope objective lens according to the fourth example has a variety of aberrations, such as chromatic aberration of magnification, excellently corrected and has excellent imaging performance.

Figure 17:
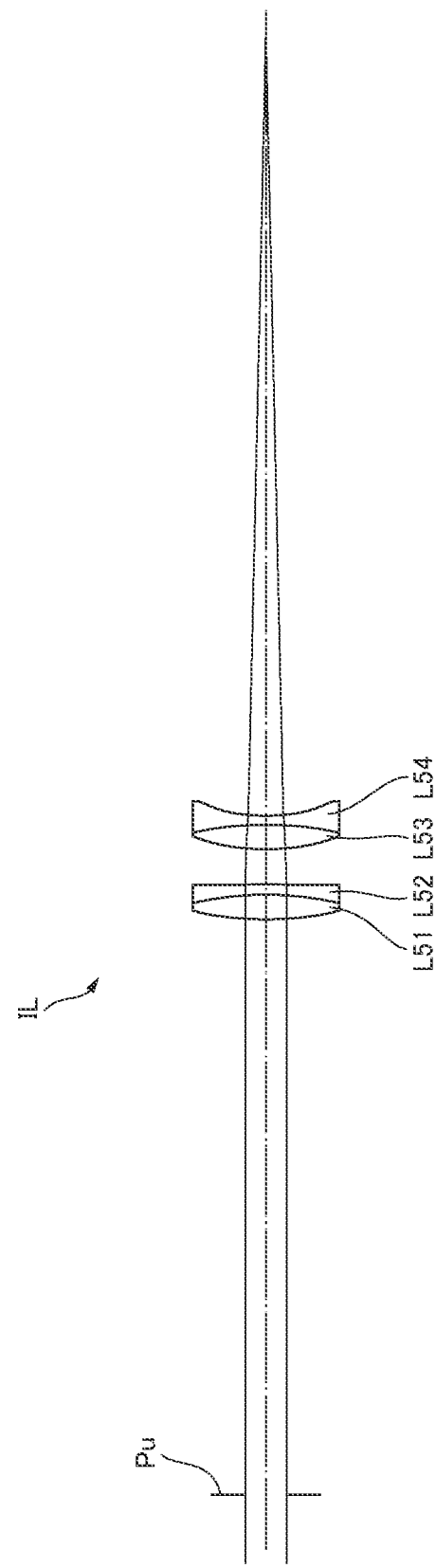
FIG. 17 is a cross-sectional view showing the configuration of a second objective lens.

The microscope objective lens according to each example is a lens of an infinite distance correction type and thus used in combination with the second objective lens that collects light from the microscope objective lens. An example of the second objective lens used in combination with the microscope objective lens will be described below with reference to FIG. 17 and Table 5. FIG. 17 is an optical path diagram showing the configuration of the second objective lens used in combination with the microscope objective lens according to each example. The variety of aberration diagrams of the microscope objective lens according to each example are obtained when the microscope objective lens is used in combination with the second objective lens. The second objective lens IL shown in FIG. 17 comprises a cemented lens formed by cementing a biconvex positive lens L51 and a biconcave negative lens L52, and a cemented lens formed by cementing a biconvex positive lens L53 and a biconcave negative lens L54, the lenses being arranged in order from the object side. The second objective lens IL is disposed on the image side of the microscope objective lens according to each example. FIG. 17 also shows an entrance pupil surface Pu of the second objective lens IL.

Table 5 below lists data values of the second objective lens. Note that, in a table of [General Data], f' represents the focal length of the second objective lens. In a table of [Lens Data], the surface number, R, D, nd, and vd are the same as in the above description of Tables 1 to 4.

TABLE 5

[General Data]

f' = 200

[Lens Data]

| Surface Number | R | D | nd | vd |
|---|---|---|---|---|
| 1 | 75.043 | 5.100 | 1.62280 | 57.03 |
| 2 | −75.043 | 2.000 | 1.74950 | 35.19 |
| 3 | 1600.580 | 7.500 | | |
| 4 | 50.256 | 5.100 | 1.66755 | 41.96 |
| 5 | −84.541 | 1.800 | 1.61266 | 44.40 |
| 6 | 36.911 | 168.438 | | |

The following presents a table of [Conditional Expression Corresponding value]. The table collectively lists values corresponding to Conditional Expressions (1) to (11) for all examples (first to fourth examples).

| Conditional Expression (1) | 1.8 < H1/H2 < 3.5 |
|---|---|
| Conditional Expression (2) | 1.3 < DLe/H2 < 3.5 |
| Conditional Expression (3) | 20 < vdLe < 30 |
| Conditional Expression (3-1) | 20 < vdLe < 26 |
| Conditional Expression (4) | 0 <− 0.0035 × (vdLe − 20) + 0.63 − θgFLe |
| Conditional Expression (5) | 20 < vdLp < 40 |
| Conditional Expression (6) | 0.55 < θgFLp |
| Conditional Expression (7) | 0 < fLp/f < 45 |
| Conditional Expression (7-1) | 12.5 < fLp/f < 45 |
| Conditional Expression (8) | 1.75 < f1/f < 2.5 |
| Conditional Expression (9) | 3 < f2/f < 7 |
| Conditional Expression (10) | f3/f < 0 |
| Conditional Expression (11) | f4/f < 0 |

[Conditional Expression Corresponding Value]

| Conditional Expression | First example | Second example | Third example | Fourth example |
|---|---|---|---|---|
| (1) | 1.93 | 1.93 | 3.21 | 2.08 |
| (2) | 1.73 | 1.39 | 3.16 | 1.22 |
| (3) | 24.80 | 25.15 | 24.80 | 24.80 |
| (3-1) | | | | |
| (4) | 0.001 | 0.002 | 0.001 | 0.001 |
| (5) | 37.00 | 27.35 | 27.79 | 24.71 |
| (6) | 0.5862 | 0.6319 | 0.6095 | 0.6291 |
| (7) | 21.02 | 38.56 | 16.18 | 16.74 |
| (7-1) | | | | |
| (8) | 1.80 | 1.81 | 2.10 | 2.19 |
| (9) | 3.62 | 3.64 | 5.64 | 3.96 |
| (10) | −189.26 | −39.45 | −10.46 | −15.55 |
| (11) | −16.64 | −18.38 | −14.24 | −22.94 |

According to each above-described example, it is possible to achieve a microscope objective lens with a variety of aberrations such as chromatic aberration of magnification excellently corrected.

The above-described examples are specific examples of the present application invention, and the present application invention is not limited thereto.

EXPLANATION OF NUMERALS AND CHARACTERS

G1 first lens group
G2 second lens group
G3 third lens group
G4 fourth lens group

The invention claimed is:

1. A microscope objective lens consisting of a first lens group, a second lens group having positive refractive power, a third lens group having a concave surface facing an image side, and a fourth lens group having a concave surface facing an object side, the lens groups being arranged in order from the object side along an optical axis, wherein
the first lens group consists of a plano-convex positive lens having a flat surface facing the object side and a negative lens, the lenses being arranged in order from the object side along the optical axis, and
the following conditional expressions are satisfied, $1.8 < H1/H2 < 3.5$ $1.3 < DLe/H2 < 3.5$ where, H1: distance from the optical axis to a light beam farthest from the optical axis in the second lens group among light beams emitted from an object on the optical axis,
H2: distance from the optical axis to a light beam farthest from the optical axis at a lens surface of a final lens among light beams emitted from the object on the optical axis, the final lens being disposed closest to the image side in the microscope objective lens, the lens surface being positioned on the image side, and
DLe: length of the final lens on the optical axis.

2. The microscope objective lens according to claim 1, wherein
the fourth lens group consists of a negative lens having a concave surface facing the object side and a positive lens, the lenses being arranged in order from the object side along the optical axis, and the final lens is the positive lens in the fourth lens group.

3. The microscope objective lens according to claim 1, wherein the following conditional expressions are satisfied, $$20 < vdLe < 30$$

$$0 < -0.0035 \times (vdLe - 20) + 0.63 - \theta gFLe$$

where, vdLe: Abbe number of the final lens, and

θgFLe: partial dispersion ratio of the final lens, which is defined by the following expression, $$\theta gFLe = (ngLe - nFLe)/(nFLe - nCLe)$$

where ngLe represents a refractive index of the final lens at a g-line, nFLe represents a refractive index of the final lens at an F-line, and nCLe represents a refractive index of the final lens at a C-line.

4. The microscope objective lens according to claim 3, wherein the following conditional expression is satisfied, $$20 < vdLe < 26.$$

5. The microscope objective lens according to claim 1, wherein the second lens group comprises a plurality of positive lenses, and at least one of the plurality of positive lenses in the second lens group satisfies the following conditional expressions, $$20 < vdLp < 40$$

$$0.55 < \theta gFLp$$

where, vdLp: Abbe number of the positive lens, and

θgFLp: partial dispersion ratio of the positive lens, which is defined by the following expression, $$\theta gFLp = (ngLp - nFLp)/(nFLp - nCLp)$$

where ngLp represents a refractive index of the positive lens at a g-line, nFLp represents a refractive index of the positive lens at an F-line, and nCLp represents a refractive index of the positive lens at a C-line.

6. The microscope objective lens according to claim 5, wherein the at least one positive lens satisfies the following conditional expression, $$0 < fLp/f < 45$$

where, fLp: focal length of the positive lens, and f: focal length of the microscope objective lens.

7. The microscope objective lens according to claim 6, wherein the at least one positive lens satisfies the following conditional expression, $$12.5 < fLp/f < 45.$$

8. The microscope objective lens according to claim 5, wherein the positive lens is disposed on the image side of a lens surface through which a light beam farthest from the optical axis passes in the second lens group.

9. The microscope objective lens according to claim 1, wherein the following conditional expression is satisfied, $$1.75 < f1/f < 2.5$$

where, f1: focal length of the first lens group, and f: focal length of the microscope objective lens.

10. The microscope objective lens according to claim 1, wherein the following conditional expression is satisfied, $$3 < f2/f < 7$$

where, f2: focal length of the second lens group, and f: focal length of the microscope objective lens.

11. The microscope objective lens according to claim 1, wherein the following conditional expression is satisfied, $$f3/f < 0$$

where, f3: focal length of the third lens group, and f: focal length of the microscope objective lens.

12. The microscope objective lens according to claim 1, wherein the following conditional expression is satisfied, $$f4/f < 0$$

where, f4: focal length of the fourth lens group, and f: focal length of the microscope objective lens.

13. The microscope objective lens according to claim 1, wherein a space between the second lens group and the third lens group is changeable.

14. A microscope optical system comprising:

the microscope objective lens according to claim 1; and a second objective lens that collects light from the microscope objective lens.

15. A microscope device comprising the microscope objective lens according to claim 1.

* * * * *